(12) United States Patent
Miles et al.

(10) Patent No.: US 9,098,831 B1
(45) Date of Patent: Aug. 4, 2015

(54) SEARCH AND DISPLAY OF HUMAN RESOURCES INFORMATION

(75) Inventors: Helen Anne Miles, Chadds Ford, PA (US); Linda Griffith, Sewickley, PA (US); Scott Paterson, Palo Alto, CA (US); Zhen Zeng, Palo Alto, CA (US); Jen M. Levin, Chicago, IL (US); Elizabeth A. Spenko, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 391 days.

(21) Appl. No.: 13/324,575

(22) Filed: Dec. 13, 2011

Related U.S. Application Data

(60) Provisional application No. 61/517,431, filed on Apr. 19, 2011.

(51) Int. Cl.
 *G06Q 10/10* (2012.01)
 *G06F 17/30* (2006.01)

(52) U.S. Cl.
 CPC ........ *G06Q 10/105* (2013.01); *G06F 17/30386* (2013.01)

(58) Field of Classification Search
 None
 See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,648,037 A | 3/1987 | Valentino |
| 4,837,422 A | 6/1989 | Dethloff et al. |
| 5,101,200 A | 3/1992 | Swett |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,918,217 A | 6/1999 | Maggioncalda et al. |
| 5,953,710 A | 9/1999 | Fleming |
| 5,963,925 A | 10/1999 | Kolling et al. |
| 5,991,749 A | 11/1999 | Morrill, Jr. |
| 6,012,044 A | 1/2000 | Maggioncalda et al. |
| 6,032,134 A | 2/2000 | Weissman |
| 6,044,360 A | 3/2000 | Picciallo et al. |
| 6,049,776 A | 4/2000 | Donnelly et al. |
| 6,052,675 A | 4/2000 | Checchio |
| 6,064,984 A | 5/2000 | Ferguson et al. |
| 6,064,986 A | 5/2000 | Edelman |
| 6,085,174 A | 7/2000 | Edelman |
| 6,088,682 A | 7/2000 | Burke |

(Continued)

FOREIGN PATENT DOCUMENTS

| | | |
|---|---|---|
| WO | WO 96/34358 A1 | 10/1996 |
| WO | WO 03/030054 A1 | 4/2003 |

OTHER PUBLICATIONS

Office Action dated Apr. 18, 2012 for U.S. Appl. No. 13/037,063, filed Feb. 28, 2011.

(Continued)

*Primary Examiner* — Robert Beausoliel, Jr.
*Assistant Examiner* — Susan F Rayyan
(74) *Attorney, Agent, or Firm* — Buchanan Ingersoll & Rooney PC; Robert J. Pugh

(57) ABSTRACT

In various embodiments, tools and user interfaces are provided that cater to the way that many employees desire to view their human resources data and human resources related transactions. These tools can be configured to provide appropriate, distilled contextual information, and transparency to the employment situation of the employee.

12 Claims, 38 Drawing Sheets

(56) References Cited

U.S. PATENT DOCUMENTS

| | | |
|---|---|---|
| 6,112,191 A | 8/2000 | Burke |
| 6,128,603 A | 10/2000 | Dent et al. |
| 6,173,269 B1 | 1/2001 | Solokl et al. |
| 6,332,154 B2 | 12/2001 | Beck et al. |
| 6,353,811 B1 | 3/2002 | Weissman |
| 6,401,079 B1 | 6/2002 | Kahn et al. |
| 6,411,938 B1 | 6/2002 | Gates et al. |
| 6,473,794 B1 | 10/2002 | Guheen et al. |
| 6,493,685 B1 | 12/2002 | Ensel et al. |
| 6,519,571 B1 | 2/2003 | Guheen et al. |
| 6,601,233 B1 | 7/2003 | Underwood |
| 6,609,110 B1 | 8/2003 | Dowd et al. |
| 6,633,878 B1 | 10/2003 | Underwood |
| 6,636,242 B2 | 10/2003 | Bowman-Amuah |
| 6,636,833 B1 | 10/2003 | Flitcroft et al. |
| 6,684,190 B1 | 1/2004 | Powers et al. |
| 6,718,314 B2 | 4/2004 | Chaum et al. |
| 6,718,535 B1 | 4/2004 | Underwood |
| 6,742,002 B2 | 5/2004 | Arrowood |
| 6,742,704 B2 | 6/2004 | Fitzmaurice et al. |
| 6,839,687 B1 | 1/2005 | Dent et al. |
| 6,839,692 B2 | 1/2005 | Carrott et al. |
| 6,876,971 B1 | 4/2005 | Burke |
| 6,921,268 B2 | 7/2005 | Bruno et al. |
| 6,993,510 B2 | 1/2006 | Guy et al. |
| 7,024,390 B1 | 4/2006 | Mori et al. |
| 7,031,939 B1 | 4/2006 | Gallagher et al. |
| 7,039,440 B2 | 5/2006 | Rodriguez et al. |
| 7,062,458 B2 | 6/2006 | Maggioncalda et al. |
| 7,076,465 B1 | 7/2006 | Blagg et al. |
| 7,100,195 B1 | 8/2006 | Underwood |
| 7,110,979 B2 | 9/2006 | Tree |
| 7,143,064 B2 | 11/2006 | Picciallo et al. |
| 7,146,338 B2 | 12/2006 | Kight et al. |
| 7,147,149 B2 | 12/2006 | Giraldin et al. |
| 7,165,041 B1 | 1/2007 | Guheen et al. |
| 7,171,370 B2 | 1/2007 | Burke |
| 7,175,073 B2 | 2/2007 | Kelley et al. |
| 7,184,979 B1 | 2/2007 | Carson |
| 7,248,855 B2 | 7/2007 | Joyce et al. |
| 7,249,092 B2 | 7/2007 | Dunn et al. |
| 7,249,097 B2 | 7/2007 | Hutchison et al. |
| 7,263,507 B1 | 8/2007 | Brake, Jr. et al. |
| 7,264,153 B1 | 9/2007 | Burke |
| 7,319,986 B2 | 1/2008 | Praisner et al. |
| 7,328,839 B2 | 2/2008 | Keohane et al. |
| 7,346,528 B2 | 3/2008 | Thengvall et al. |
| 7,376,569 B2 | 5/2008 | Plunkett et al. |
| 7,379,887 B2 | 5/2008 | Pachon et al. |
| 7,382,773 B2 | 6/2008 | Schoeneberger et al. |
| 7,401,731 B1 | 7/2008 | Pietz et al. |
| 7,502,758 B2 | 3/2009 | Burke |
| 7,536,351 B2 | 5/2009 | Leblang et al. |
| 7,571,849 B2 | 8/2009 | Burke |
| 7,577,665 B2 | 8/2009 | Ramer et al. |
| 7,580,881 B2 | 8/2009 | Singer et al. |
| 7,620,573 B2 | 11/2009 | Jameson |
| 7,627,512 B2 | 12/2009 | Harris et al. |
| 7,647,322 B2 | 1/2010 | Thomsen |
| 7,660,581 B2 | 2/2010 | Ramer et al. |
| 7,668,768 B2 | 2/2010 | Oikonomidis |
| 7,672,861 B2 | 3/2010 | Al-Otaibi et al. |
| 7,685,083 B2 | 3/2010 | Fairweather |
| 7,707,052 B2 | 4/2010 | Kuhn et al. |
| 7,711,619 B2 | 5/2010 | Merton et al. |
| 7,716,217 B2 | 5/2010 | Marston et al. |
| 7,729,959 B1 | 6/2010 | Wells et al. |
| 7,752,123 B2 | 7/2010 | Brookfield et al. |
| 7,774,257 B2 | 8/2010 | Maggioncalda et al. |
| 7,783,564 B2 | 8/2010 | Mullen et al. |
| 7,788,146 B2 | 8/2010 | McCarthy, Jr. |
| 7,792,748 B1 | 9/2010 | Ebersole et al. |
| 7,797,181 B2 | 9/2010 | Vianello |
| 7,797,218 B2 | 9/2010 | Rosen et al. |
| 7,797,226 B2 | 9/2010 | Ram et al. |
| 7,801,814 B2 | 9/2010 | Cataline et al. |
| 7,809,641 B2 | 10/2010 | Sanders et al. |
| 7,818,233 B1 | 10/2010 | Sloan et al. |
| 7,827,102 B2 | 11/2010 | Saliba et al. |
| 7,831,494 B2 | 11/2010 | Sloan et al. |
| 7,835,972 B2 | 11/2010 | Almeida et al. |
| 7,844,492 B2 | 11/2010 | Perkowski et al. |
| 7,844,546 B2 | 11/2010 | Fleishman |
| 7,848,948 B2 | 12/2010 | Perkowski et al. |
| 7,860,871 B2 | 12/2010 | Ramer et al. |
| 7,865,187 B2 | 1/2011 | Ramer et al. |
| 7,870,066 B2 | 1/2011 | Lin |
| 7,912,790 B2 | 3/2011 | Albertsson |
| 7,937,292 B2 | 5/2011 | Baig et al. |
| 7,962,419 B2 | 6/2011 | Gupta et al. |
| 8,015,090 B1 | 9/2011 | Borzych et al. |
| 8,065,230 B1 | 11/2011 | Little |
| 8,086,558 B2 | 12/2011 | Dewar |
| 8,099,350 B2 | 1/2012 | Ryder |
| 2001/0047310 A1 | 11/2001 | Russell |
| 2002/0002479 A1 | 1/2002 | Almog et al. |
| 2002/0007330 A1 | 1/2002 | Kumar et al. |
| 2002/0026412 A1 | 2/2002 | Kabin |
| 2002/0046074 A1 | 4/2002 | Barton |
| 2002/0052773 A1 | 5/2002 | Kraemer et al. |
| 2002/0055870 A1 | 5/2002 | Thomas |
| 2002/0077955 A1 | 6/2002 | Ramm |
| 2002/0095363 A1 | 7/2002 | Sloan et al. |
| 2002/0099635 A1 | 7/2002 | Guiragosian |
| 2002/0103805 A1 | 8/2002 | Canner et al. |
| 2002/0120568 A1 | 8/2002 | Leblang et al. |
| 2002/0123949 A1 | 9/2002 | VanLeeuwen |
| 2002/0133368 A1 | 9/2002 | Strutt et al. |
| 2002/0147672 A1 | 10/2002 | Gaini |
| 2002/0152158 A1 | 10/2002 | Paleiov et al. |
| 2002/0188536 A1 | 12/2002 | Molosavljevic et al. |
| 2003/0009411 A1 | 1/2003 | Ram et al. |
| 2003/0033226 A1 | 2/2003 | Anderson |
| 2003/0050889 A1 | 3/2003 | Burke |
| 2003/0055758 A1 | 3/2003 | Sidhu et al. |
| 2003/0083930 A1 | 5/2003 | Burke |
| 2003/0135634 A1 | 7/2003 | Moeller et al. |
| 2003/0177027 A1 | 9/2003 | Dimarco |
| 2003/0216957 A1 | 11/2003 | Florence et al. |
| 2003/0221118 A1 | 11/2003 | Walker |
| 2004/0012588 A1 | 1/2004 | Lulis |
| 2004/0019543 A1 | 1/2004 | Blagg et al. |
| 2004/0044632 A1 | 3/2004 | Onn et al. |
| 2004/0054610 A1 | 3/2004 | Amstutz et al. |
| 2004/0068432 A1 | 4/2004 | Meyerkopf et al. |
| 2004/0088177 A1 | 5/2004 | Travis et al. |
| 2004/0107112 A1 | 6/2004 | Cotter |
| 2004/0117202 A1 | 6/2004 | Winklevoss et al. |
| 2004/0148234 A1 | 7/2004 | Gonen-Friedman et al. |
| 2004/0158513 A1 | 8/2004 | Musacchio |
| 2004/0186852 A1 | 9/2004 | Rosen |
| 2004/0192351 A1 | 9/2004 | Duncan |
| 2004/0215560 A1 | 10/2004 | Amalraj et al. |
| 2004/0254805 A1 | 12/2004 | Schwerin-Wenzel et al. |
| 2004/0267559 A1 | 12/2004 | Hinderer et al. |
| 2005/0026119 A1 | 2/2005 | Ellis et al. |
| 2005/0027632 A1 | 2/2005 | Zeitoun et al. |
| 2005/0060228 A1 | 3/2005 | Woo |
| 2005/0060318 A1 | 3/2005 | Brickman, Jr. |
| 2005/0080691 A1 | 4/2005 | Holm-Blagg |
| 2005/0086075 A1 | 4/2005 | Kaehler et al. |
| 2005/0154662 A1 | 7/2005 | Langenwalter |
| 2005/0164151 A1 | 7/2005 | Klein |
| 2005/0187804 A1 | 8/2005 | Clancy et al. |
| 2005/0240431 A1 | 10/2005 | Cotter |
| 2005/0282126 A1 | 12/2005 | Pesso |
| 2006/0064378 A1 | 3/2006 | Clementz et al. |
| 2006/0069635 A1 | 3/2006 | Ram et al. |
| 2006/0095331 A1 | 5/2006 | O'Malley et al. |
| 2006/0100919 A1 | 5/2006 | Levine |
| 2006/0122922 A1 | 6/2006 | Lowenthal |
| 2006/0122923 A1 | 6/2006 | Burke |
| 2006/0149609 A1 | 7/2006 | Stenerson et al. |
| 2006/0163341 A1 | 7/2006 | Tulluri et al. |

(56) References Cited

U.S. PATENT DOCUMENTS

| | | |
|---|---|---|
| 2006/0178971 A1 | 8/2006 | Owen et al. |
| 2006/0224478 A1 | 10/2006 | Harbison et al. |
| 2006/0235777 A1 | 10/2006 | Takata |
| 2006/0242084 A1 | 10/2006 | Moses |
| 2006/0277091 A1 | 12/2006 | Kochikar et al. |
| 2006/0277128 A1 | 12/2006 | Anandarao et al. |
| 2006/0282353 A1 | 12/2006 | Gikandi |
| 2006/0282369 A1 | 12/2006 | White |
| 2007/0005477 A1 | 1/2007 | McAtamney |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0319781 A1 | 12/2008 | Stivoric et al. |
| 2009/0006418 A1 | 1/2009 | O'Malley |
| 2009/0063353 A1 | 3/2009 | Viidu et al. |
| 2009/0092241 A1 | 4/2009 | Minert et al. |
| 2009/0094170 A1 | 4/2009 | Mohn |
| 2009/0112674 A1 | 4/2009 | Musso et al. |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1 | 7/2009 | Trombley |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0292728 A1* | 11/2009 | Aleixo ........................ 707/104.1 |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0063981 A1 | 3/2010 | Thomsen |
| 2010/0070323 A1 | 3/2010 | Polcari et al. |
| 2010/0070448 A1* | 3/2010 | Omoigui ........................ 706/47 |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1* | 4/2010 | Cooper et al. ................ 707/769 |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo |
| 2010/0131899 A1* | 5/2010 | Hubert ........................ 715/823 |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks Rix |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332379 A1 | 12/2010 | Ram et al. |
| 2011/0029567 A1* | 2/2011 | Banda et al. ................ 707/784 |
| 2011/0173118 A1 | 7/2011 | Hu |
| 2011/0276494 A1 | 11/2011 | Hutchison et al. |
| 2011/0276921 A1* | 11/2011 | Long ........................ 715/825 |
| 2011/0282803 A1 | 11/2011 | Woods et al. |

OTHER PUBLICATIONS

U.S. Appl. No. 12/152,028, filed May 12, 2008.
U.S. Appl. No. 12/152,074, filed May 12, 2008.
U.S. Appl. No. 12/120,995, filed May 15, 2008.
U.S. Appl. No. 12/479,378, filed Jun. 5, 2009.
U.S. Appl. No. 12/696,959, filed Jan. 29, 2010.
U.S. Appl. No. 12/696,968, filed Jan. 29, 2010.
U.S. Appl. No. 12/696,647, filed Jan. 29, 2010.
U.S. Appl. No. 12/803,705, filed Jul. 2, 2010.
U.S. Appl. No. 13/037,063, filed Feb. 28, 2011.
U.S. Appl. No. 13/037,072, filed Feb. 28, 2011.
U.S. Appl. No. 13/037,096, filed Feb. 28, 2011.
U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/754,974, filed Apr. 6, 2010.
U.S. Appl. No. 12/803,684, filed Jul. 2, 2010.
U.S. Appl. No. 13/324,534, filed Dec. 13, 2011.
U.S. Appl. No. 13/324,596, filed Dec. 13, 2011.
U.S. Appl. No. 13/355,056, filed Jan. 20, 2012.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.

(56) References Cited

OTHER PUBLICATIONS

"Split IT by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=Home_Page, Internet site, accessed on Apr. 11, 2008, 1 page.
"Use Buxfer's analytics to *understand* your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.
"Setup budgets to control your expenses," printed from http://www.buxfercom/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," *memphis apartments tv.com*, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPal Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accrssed on Sep. 18, 2007, 1 page.
"Review Payment Details—PayPal," printed from https://www.paypal.com/us/cgi-bin/webscr?cmd=_flow&SESSION=RMXX7KRmInYnF, Internet site, accessed on Sep. 18, 2007, 1 page.

"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.
"Ducont—Mobile Payments," printed from http://www.ducont.com/Products/bnf_mdhm.htm, Internet site, accessed on Oct. 11, 2007, 1 page.
"Ducont—Bank.companion," printed from http://www.ducont.com/Products/bnf_bankcomp.htm, Internet site, accessed on Oct. 11, 2007, 1 page.
"MyCheckFree.com," printed from https://mycheckfree.com/br/wps?sp=10001&rq=bfbl, Internet site, accessed on Sep. 14, 2007, 1 page.
"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.
"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.
"Paytrust : Paying Bills Has Never Been Easier," printed from http://www.paytrust.com/learnmore.shtml, Internet site, accessed on Sep. 14, 2007, 2 pages.
"Why Use Paytrust® Instead of a Traditional Bill-Pay Service?" printed from http://www.paytrust.com/morethanbillpay.shtml, Internet site, accessed on Sep. 14, 2007, 3 pages.
Richard Irons, "What is Envelope Budgeting—Why the Envelope Budgeting System is so Effective?" printed from http://www.mvelopes.com/articles/envelope-budgeting.php, Internet site, 3 pages.
"Pocket Quicken," printed from http://www.landware.com/pocketquicken, Internet site, accessed on Sep. 14, 2007, 2 pages.
"Mobile Quicken™—Stand Alone or Connect with a Click," printed from http://www.landware.com/pocketquicken/moreinfo.html, Internet site, accessed on Sep. 14, 2007, 4 pages.
"UnitedOne Credit Union," printed from http://www.unitedone.org/ASP/home.asp, Internet site, accessed on Sep. 14, 2007, 3 pages.
"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.
"Quicken Starter Edition 2008," printed from http://quicken.intuit.com/personal-finance/starter-edition-personal-budget.jhtml, Internet site, accessed on Sep. 14, 2007, 5 pages.
"Jul. 2007 calendar," printed from http://quicken.intuit.com/images/screenshots/ss_calendar_lrg.gif, Internet site, accessed on Sep. 14, 2007, 1 page.
"Navigator," dated Jul. 2006, printed from www.pscu.org, Internet site accessed on Oct. 17, 2007, 2 pages.

(56) References Cited

OTHER PUBLICATIONS

"Bank of America Privacy Assist Premier™—Protect your credit and identity," printed from http://www.bankofamerica.com/pap/index.cfm?template=pap assist premier, Internet site, accessed on Oct. 17, 2007, 2 pages.

"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, accessed on Oct. 17, 2007, 2 pages.

"Technology Credit Union," printed from http://www.techcu.com/resources/about_tech_cu/privacy/online.htm Internet site, accessed on Oct. 17, 2007, 1 page.

"Billshare.org—Make Bill Paying with Roomies Easy—KillerStartups.com," printed from http://www.killerstartups.com/Web20/billshare—Make-Bill-Paying-with-Roomies-Easy/, Internet site, accessed on Sep. 18, 2007, 4 pages.

Every Penny Counts, Inc., Patent Property Due Diligence Chart, prepared Aug. 30, 2007, 8 pages.

David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.

Phillip Robinson, "Mastering Your Money," *San Jose Mercury News*, Oct. 9, 1994, 3 pages.

Tom Rawstorne, "What's your child buying online?; Alcohol, knives, pornography . . . All bought over the internet by a 14-year-old boy using a debit card. So why are the banks giving them to children without telling their parents?" *Daily Mail*, London, Jul. 10, 2008, p. 50, retrieved Jun. 30, 2011, 5 pages.

CNNMoney.com, "What are you worth?" printed from http://web.archive.org/web/20021008185050/http://cgi.money.cnn.com/tools/networth/networth.html, Internet site, accessed on Jul. 13, 2011, 2 pages.

Office Action dated Sep. 28, 2010 for U.S. Appl. No. 12/152,073, filed May 12, 2008.

Notice of Allowance dated May 3, 2011 for U.S. Appl. No. 12/152,073, filed May 12, 2008.

Office Action dated Apr. 2, 2009 for U.S. Appl. No. 12/152,028, filed May 12, 2008.

Office Action dated Sep. 16, 2009 for U.S. Appl. No. 12/152,028, filed May 12, 2008.

Office Action dated Jun. 15, 2010 for U.S. Appl. No. 12/152,028, filed May 12, 2008.

Office Action dated Oct. 1, 2010 for U.S. Appl. No. 12/152,074, filed May 12, 2008.

Office Action dated Apr. 13, 2010 for U.S. Appl. No. 12/120,995, filed May 15, 2008.

Notice of Allowance dated Sep. 23, 2010 for U.S. Appl. No. 12/120,995, filed May 15, 2008.

Notice of Allowance dated Jul. 11, 2011 for U.S. Appl. No. 12/172,541, filed Jul. 14, 2008.

Office Action dated Jul. 8, 2011 for U.S. Appl. No. 12/366,711, filed Feb. 6, 2009.

Office Action dated Aug. 4, 2011 for U.S. Appl. No. 12/479,378, filed Jun. 5, 2009.

Office Action dated Jan. 3, 2012 for U.S. Appl. No. 12/696,968, filed Jan. 29, 2010.

Office Action dated Jan. 3, 2012 for U.S. Appl. No. 12/696,959, filed Jan. 29, 2010.

Office Action dated Mar. 21, 2012 for U.S. Appl. No. 12/366,711, filed Feb. 6, 2009.

Office Action dated Mar. 15, 2012 for U.S. Appl. No. 12/479,378, filed Jun. 5, 2009.

Office Action dated Mar. 12, 2012 for U.S. Appl. No. 13/300,940, filed Nov. 21, 2011.

Office Action dated Feb. 1, 2012 for U.S. Appl. No. 12/696,647, filed Jan. 29, 2010.

Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.

"How can I automatically generate an index in Word?," printed from http://word.mvps.org/faqs/formatting/CreateIndexContent.htm, Internet site, accessed on Feb. 17, 2011, 4 pages.

"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp., Internet site, accessed on Jul. 17, 2011, 7 pages.

"FREE Online Employee Attendance Tracking Software," printed from http://www.tracksmart.com, Internet site, accessed on Jul. 17, 2011, 2 pages.

"Compensation Software Solutions for Small Business I Taleo," printed from http://www.taleo.com/solutions/taleo-business-edition-comp?_kk=HR%, Internet site, accessed on Jul. 17, 2011, 1 page.

"Tracking training has never been so easy." printed from http://www.conductit.com/, Internet site, accessed on Jul. 17, 2011, 2 pages.

"Track Employee Training Easily with Conductor® Employee Education Training Tracking Software," printed from http://www.conductit.com/product.asp, Internet site, accessed on Jul. 17, 2011, 2 pages.

"HSBC Employee Career Track Information," printed from http://www.hsbcusa.com/careers/hsbc_employees/impacted_employee_information.html, Internet site, accessed on Jul. 17, 2011, 2 pages.

"Conductor® at a glance Take the Quick Tour!" printed from http://www.conductit.com/tour.asp#1, Internet site, accessed on Jul. 17, 2011, 11 pages.

"Replicon—Time Tracking made Easy with Web TimeSheet," printed from http://www.replicon.com/lp/lp_ta_vacation_tracking.aspx?, Internet site, accessed on Jul. 17, 2011, 2 pages.

* cited by examiner

SEARCH AND DISPLAY OF HUMAN RESOURCES INFORMATION

CROSS REFERENCE TO RELATED APPLICATION/PRIORITY CLAIM

The present application claims the benefit of U.S. Provisional Patent Application Ser. No. 61/517,431, filed on Apr. 19, 2011, the entirety of which is hereby incorporated by reference.

FIELD OF THE INVENTION

In various embodiments, the invention provides enhanced processes, methods, tools, strategies, and techniques for processing, managing, analyzing, or communicating human resources information within a computing environment.

BACKGROUND

Many large organizations, such as financial institutions, must process a significant volume of human resources information for their employees and other personnel. In general, the human resources area is a broad and diverse environment that deals with situations ranging from straightforward problems to very complex and emotional issues for employees. To promote success of the organization, it is critical to bridge the gulf between the voluminous amount of human resources information available and the nature of the issues for which the information is needed.

However, many human resource servicing models are inconsistent in their delivery and content, often possessing multiple entry points and creating various process inefficiencies. Managers and employees may unnecessarily spend a substantial amount of time navigating human resource processes, and escalations of even simple issues can occur with undesired frequency. Among other negative consequences, ineffective management of human resources information can lead to reduced employee productivity, misapplication of valuable benefits, and overall dissatisfaction with the organization.

In view of these issues, enhanced processes, methods, tools, strategies, and techniques are needed for processing, managing, analyzing, and communicating human resources information within an organization.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIG. 16 includes an example of a policy that may be accessed through various links provided within a human resources information management system;

DESCRIPTION

In various embodiments, the invention offers an innovative design interface with tools that cater to the way that many employees and other personnel desire to view their human resources data. These tools can be configured to provide appropriate, distilled contextual information and transparency to the employment situation of the employee. In addition, these tools can reduce uncertainty for the employee, increase a sense of control, increase a depth of satisfaction with benefits management, and foster healthy employer-employee relationships. As described below, various embodiments of the invention provide a content model including modules and tools for notifications (e.g., communications regarding human resource related events); compensation (e.g., at-a-glance information about monetary ways that the organization compensates an employee); benefits (e.g., information about non-salary ways in which the organization compensates employees); career development (e.g., resources to help employees manage their careers, skills, and educational opportunities); retirement (e.g., information to help employees manage 401(k) accounts and prepare for retirement); and, user profile (e.g., including user information such as basic information, contact information, communication preferences, and/or job information).

Figure 1:
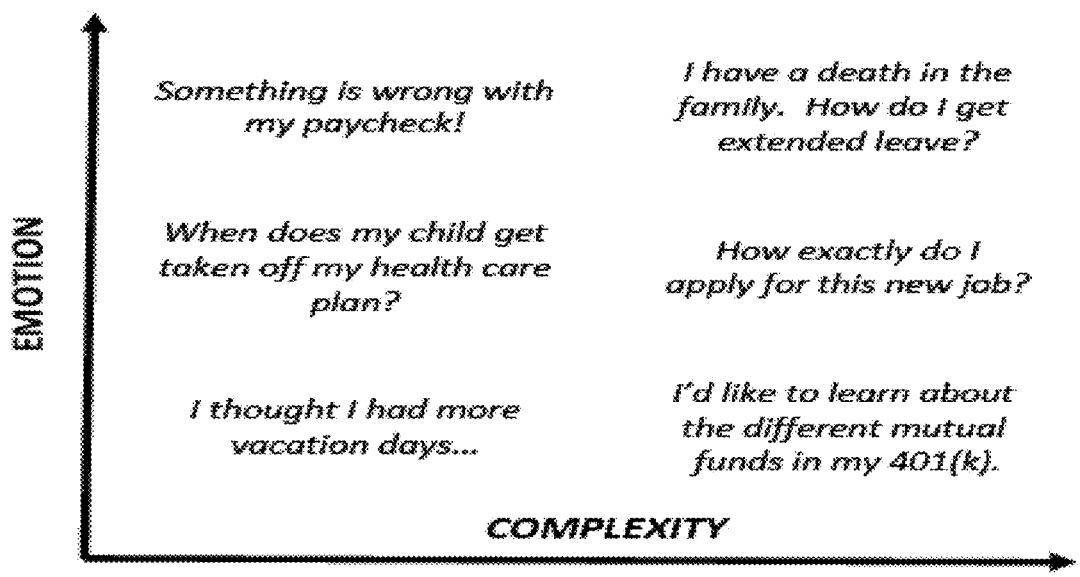
FIG. 1 includes a graph that schematically illustrates the complexity and emotional components of human resource related issues.

The inventors have recognized the need to develop a business model for human resources that invites employee interaction, drives usage of applicable employee benefits and information, and supports the profitability goals of an organization. In various embodiments, the invention may offer employees a differentiated experience through a unique human resource solution focused on consolidated online tools. A consistent and reliable human resource experience can be created that addresses the needs of employees and managers. FIG. 1 schematically illustrates how the inventors have recognized the problem of addressing human resource related issues on the basis of both the complexity of the issues as well as the emotional component attached to the issues by employees.

Benefits that can be realized by various embodiments of the invention include reducing costs through improved employee and management productivity, increasing employee engagement and satisfaction, improving employee engagement to reduce absenteeism and turnover, and enhancing quality of services delivered to customers. By using various embodiments of the invention, an organization can gain trust and confidence as a partner in helping employees achieve their goals. More efficient and effective human resources transactions can be executed, including providing managers with additional tools to support the workforce. Escalation of unresolved issues can be reduced, further increasing efficiency and first inquiry resolution. Also, the organization may experience increased employee awareness and utilization of benefits, offerings, and services.

In addition, embodiments of the invention can facilitate setting clear boundaries around employees' personal lives to enhance trust between the employees and the organization. The impact on employees can be brought to the forefront by distinguishing between those benefits to which employees are automatically entitled versus those benefits that require employee contributions or active enrollment. In utilizing various aspects of the invention, the organization can actively highlight educational opportunities. Also, transparency around potential surprises or issues can be created. Logistical support can be provided to employees, and opportunities to reach out to other employees and supportive services inside and outside of the organization can be promoted (e.g., call center assistance). In various embodiments, the invention can help employees to identify appropriate subject matter experts, enabling the employees to obtain help on their own terms (i.e. timing and channel) with a consistent specialist. In other aspects, complex policies and procedures can be translated into actionable steps for employees by previewing the process and focusing on actions needed and expectations for all parties. Also, progress reports can be generated that highlight important milestones and next steps. In addition, various situations can be personalized for employees to demonstrate the bottom-line impact of various options.

Figure 2:
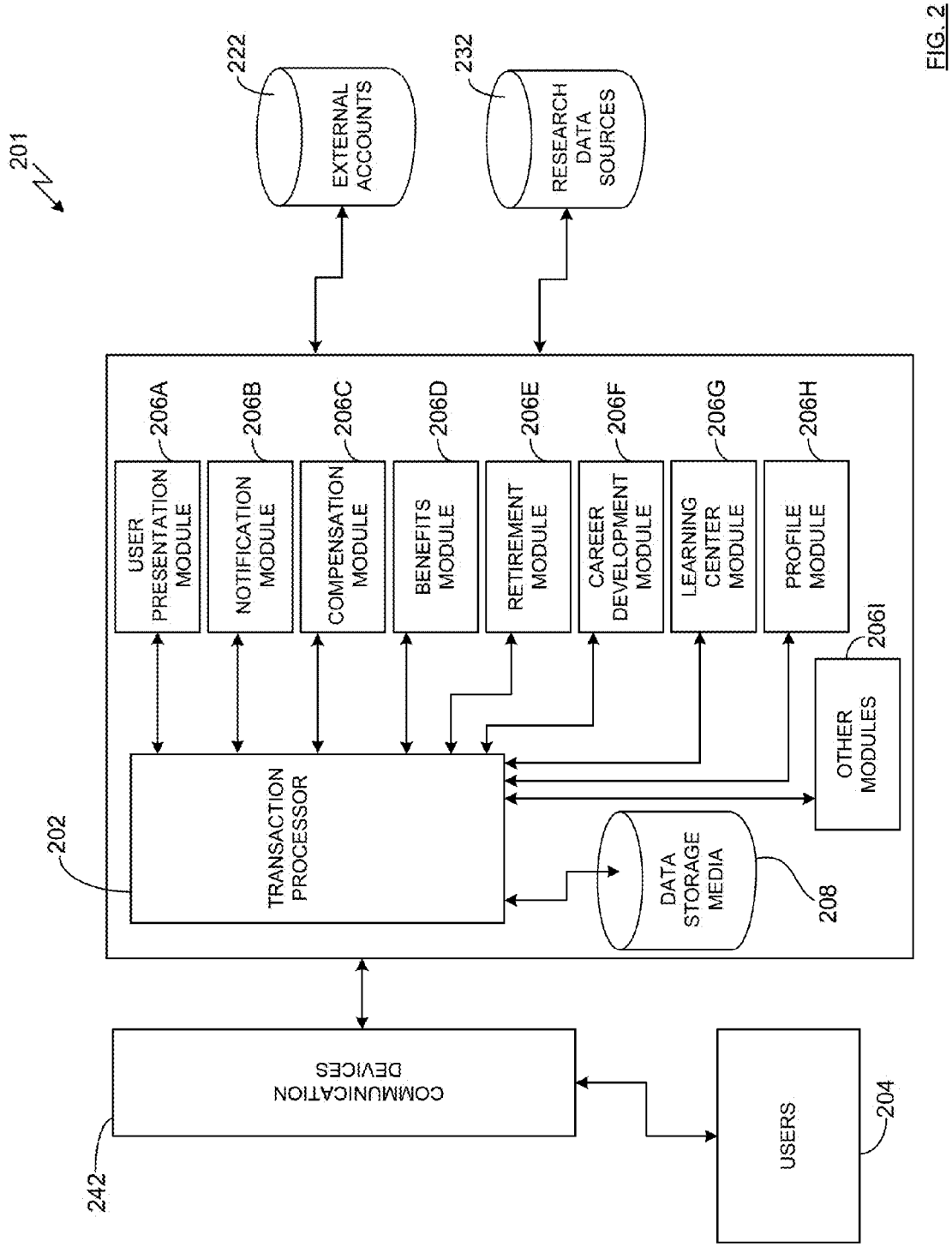
FIG. 2 schematically illustrates various aspects of an example of a human resources information management system.

FIG. 2 illustrates various aspects of an example of a human resources information management system 201 configured in accordance with certain embodiments of the invention. The management system 201 may include one or more transaction processors 202 which may be programmed to process human resources related data, for example, and other information related to the compensation, benefits, retirement plans, career development, and other employment-related data associated with employees and other personnel associated with an organization. In certain embodiments, the transaction processor 202 may include a web server architecture, for example, or another computer system capable of processing data and/or serving screen displays or other user interface tools to various users 204.

The transaction processor 202 may be operatively associated with one or more modules 206A-206I that perform various functions within the management system 201. The modules 206A-206I may include software, firmware, and/or other types of computer-readable instructions representing various functions or tools that can be executed by the management system 201. A user presentation module 206A can be programmed to display different screen displays or user interface tools that permit users 204 to issue commands to the management system 201 or to access data stored within the system 201. A notification module 206B can be programmed to display a calendar view and/or a list view of notifications communicated from a human resources department of the organization, for example. A compensation module 206C can be programmed to display information associated with salary data of the employee, for example, such as paycheck deposit information. A benefits module 206D can be programmed to display benefits-related data such as time off information for an employee including vacation days, sick days, or volunteer time, as well as health care, other insurance, and/or work/life related accounts. A retirement module 206E can be programmed to display retirement account data, such as 401(k) account information of the employee. A career development module 206F can be configured to display upcoming events related to skill development or education of the employee including performance reviews or training opportunities, for example. In various embodiments, a learning center module 206G can be programmed to organize and present information such as articles related to various human resource related topics. A profile module 206H can be provided that presents or provides access to personal information, work contact information, job detail information, and/or compensation data, for example, associated with different users. Various other modules 206I may also be programmed to perform various functions or provide user interface tools within the management system 201.

In various embodiments, the management system 201 may include one or more data storage media 208 operatively associated with the transaction processor 202. The data storage media 208 may include human resources data and other information associated with one or more client 204 accounts. Examples of data that may be stored in the data storage media 208 include data related to employee compensation, career planning, calendar notification data, retirement accounts, benefits-related information, and many other kinds of human resources information. The management system 201 may also communicate with one or more external accounts 222 to receive or transmit data. One or more of the external accounts 222 may be financial accounts associated with the users 204, for example. The management system 201 may also be configured for communication with one or more research data sources 232. For example, one or more of the research data sources 232 may include a link to articles on a particular human resources related topic. In various embodiments, users 204 may communicate or interact with the management system 201 through a variety of communication devices 242. Examples of possible communication devices 242 include personal computers (e.g., laptops, tablets, notebooks, desktops, etc.), mobile phones, smart phones, personal data devices, and many other devices which can connect to the management system 201 through a wireless or wireline connection (e.g., Internet, intranet, or another type of connection). For example, the management system 201 may be programmed to communicate with users 204 by texting, e-mail communication, or other like messaging systems.

Figure 3:
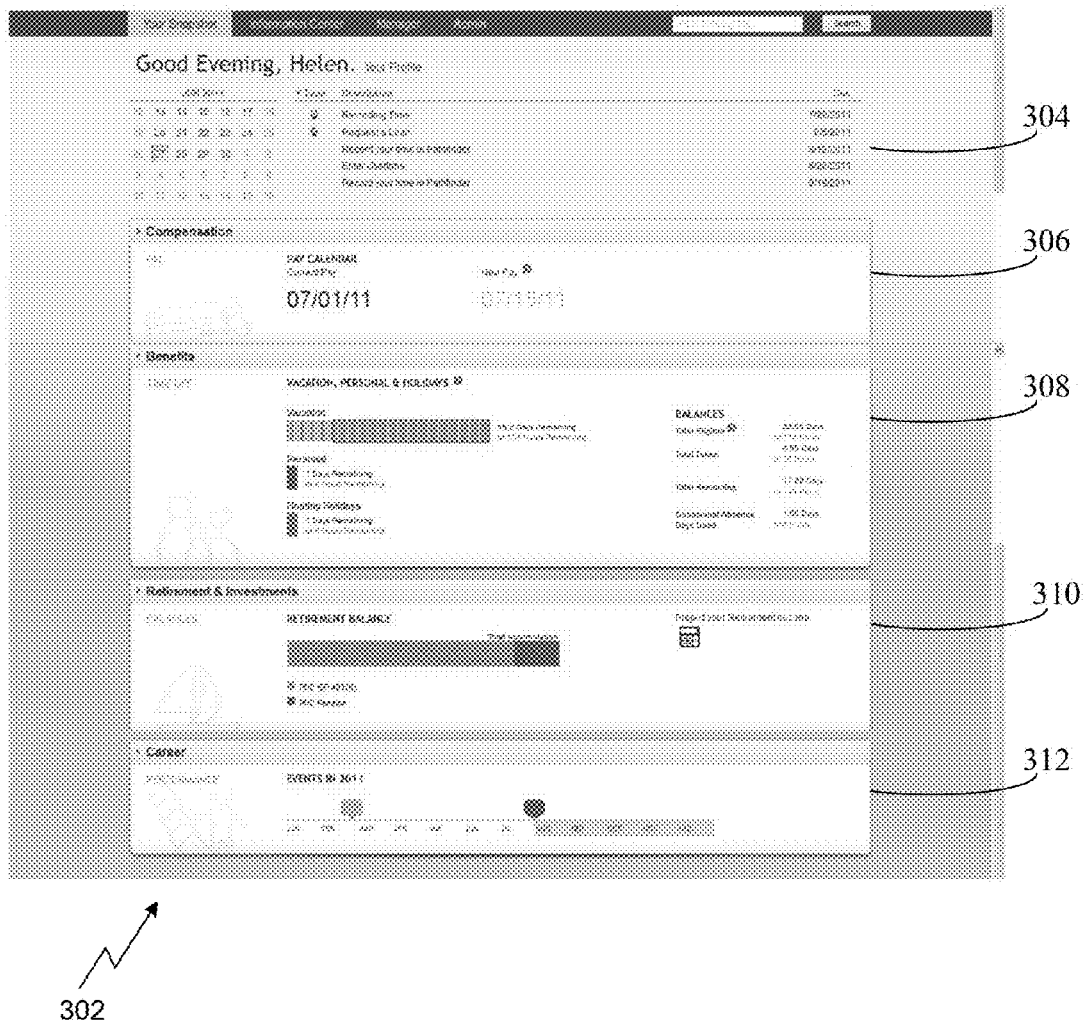
FIG. 3 illustrates an example of a screen display that may be generated by a user presentation module of a human resources information management system.

FIG. 3 illustrates an example of a screen display 302 that may be generated by the user presentation module 206A of the management system 201. In this example, the screen display 302 provides a consolidated portal view of various human resource related panels 304, 306, 308, 310, 312. The panels 304-312 can be generated in accordance with the operation and execution of the various modules 206 of the management system 201 (see discussion of modules 206 above). A notification panel 304 can be programmed to display various communications that a user 204 might receive from a human resources department or other human resources agents of the organization. A compensation panel 306 may present salary-based compensation information, such as dates of past or future paycheck deposits. A benefits panel 308 displays benefits-related data such as time off information for an employee including vacation and holidays, sick days, or volunteer time, as well as health care, other insurance, and/or work/life related accounts. A retirement panel 310 can be programmed to display account information such as employee contributions and employer contributions to a retirement account. Also, the financial performance of the retirement accounts during a predetermined time period can be displayed on the retirement panel 310. A career development panel 312 can be programmed to identify and track upcoming educational classes and performance reviews for the employee, for example. The career development panel 312 may also provide a link to suggested training or educational classes for the employee to consider.

Figure 4:
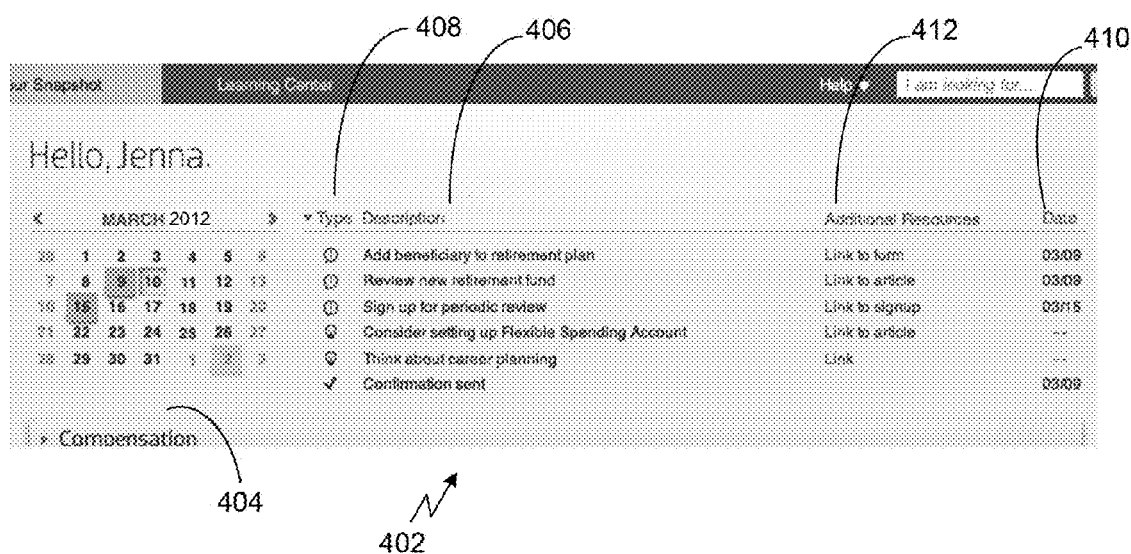
FIGS. 4, 4A and 4B include screen displays which illustrate examples of notification panels that may be generated by a human resources information management system.

FIG. 4 illustrates an example of a notification panel 402 that may be configured in accordance with various aspects of the invention. In one section of the panel 402, a calendar view section 404 can be provided that includes notifications requiring time-based action (e.g., to-do items or confirmations). Each notification item ort the calendar view section 404 may be shaded to simulate a "post-it" type covering, for example. As discussed previously, notifications may be communicated from a human resources agent or a call center employee, for example. The notifications may reflect action that a user 204 should take such as adding a beneficiary to a retirement plat, reviewing a new retirement fund, signing up for a periodic benefits review, establishing a flexible spending account exploring educational classes available for a career development opportunity, or many others. The notifications may be included within a text list 406 displayed within the notification panel 402.

A "Type" column 408 can be included to show an icon displaying whether each notification represents a to-do item (e.g., text bubble with an exclamation point), a recommendation item (e.g., a light bulb), or a confirmation item (e.g., a check mark). The order of the list can be defaulted to the "Type" column (as denoted by the arrow pointing down) or by the order of descending date. Examples of "Type" designations include the following: active or pending to-do item (e.g., within 7 days before the due date); active to-do item; recommended item; pending to-do item; confirmation item; deadline passed to-do item; or completed to-do item. In various embodiments, a "Status" column may be provided which is applicable to the to-do items (see, e.g., FIGS. 4A and 4B). The "Status" may begin as incomplete with an unmarked box, and then can be marked (or unmarked) by the user 204 to make the status pending (e.g., with a checked box). The notification panel 402 may be configured to move a pending or incomplete to-do item that has been confirmed as complete to the bottom of the list 406, for example. A pending or incomplete to-do item may be configured to change color (e.g., become red) and move to the top of the list 406 prior to the due date. After the due date has passed, incomplete or pending to-do items may be marked as "deadline passed" and may be configured to expire within a predetermined time (e.g., 30 days) after the deadline. A "Date" column 410 may be included to show the user 204 when an item is due or otherwise scheduled for action. The notifications in the notification panel 402 can be configured to be saved or exported to a "Lotus Notes" or "Outlook" calendar, for example. In various embodiments, the notification panel 402 may include one or more "Additional Resources" links 412 that permit the user 204 to access benefit forms, informational articles, or sign-up for human resource related service offerings (e.g., classes, accounts, benefits, or others).

Figure 4A:
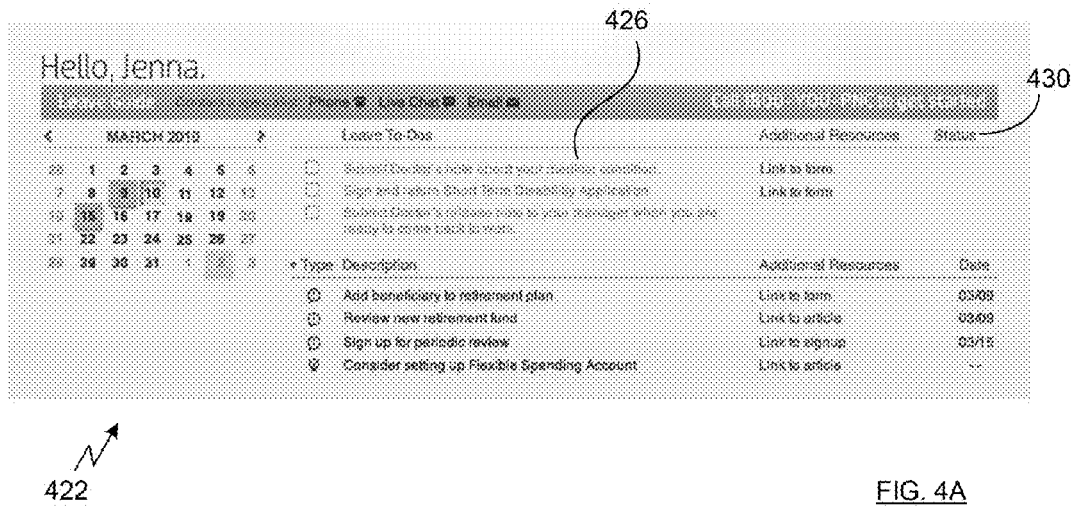
Figure 4B:
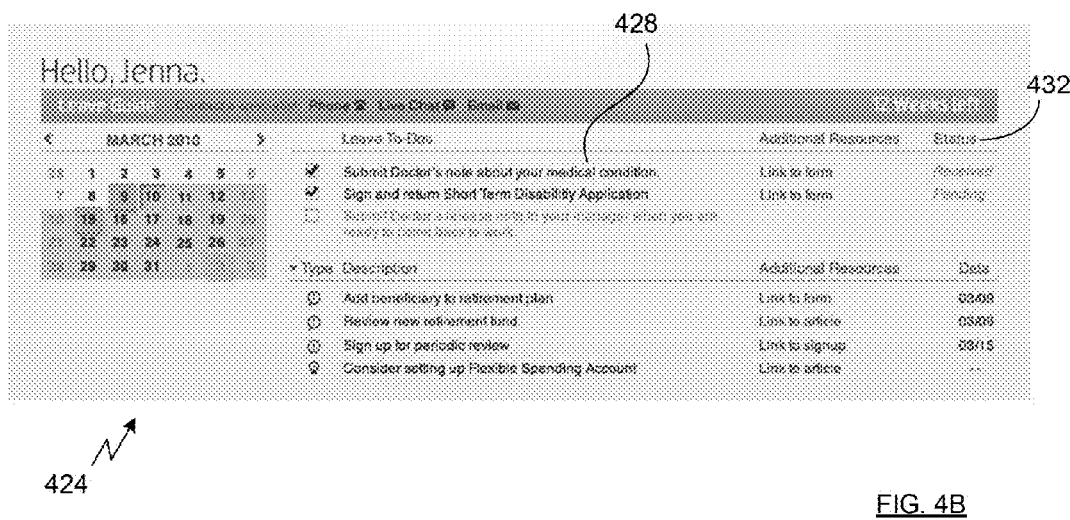

FIGS. 4A and 4B include screen displays 422, 424, which illustrate an example of an employee preparing to undertake a short term disability leave. In this example, a series of to-do items 426, 428 related to forms, applications, and other documentation that must be completed in connection with the leave can be presented to the employee. As shown, a "Status" column 430, 432 can be provided to reflect which documents have been received, are pending, are still in process, and other appropriate status identifiers.

Figure 5:
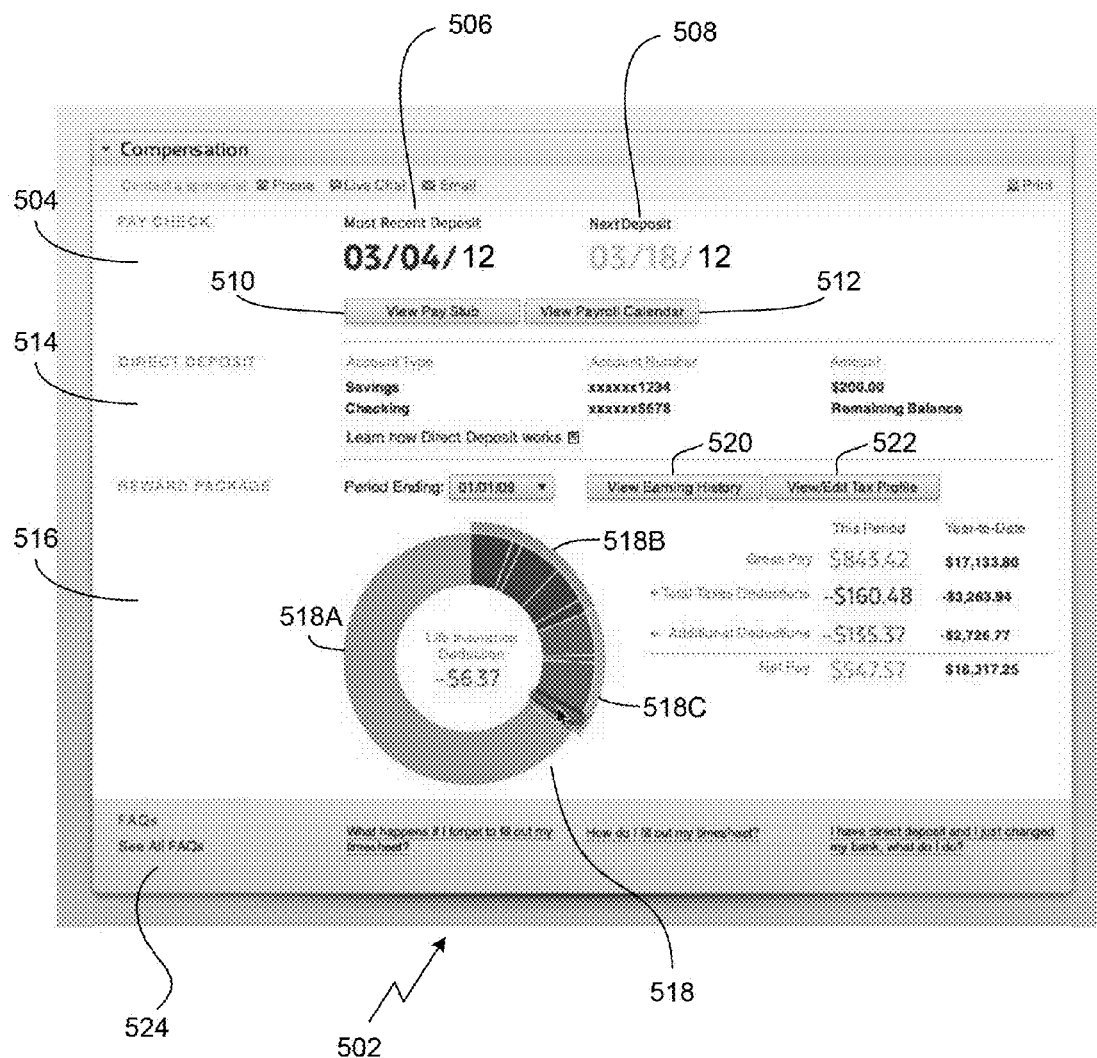
FIG. 5 includes a screen display which illustrates an example of a compensation panel that may be generated by a human resources information management system.

FIG. 5 illustrates an example of a compensation panel 502 that can be configured in accordance with various embodiments of the invention. The compensation panel 502 can include a pay check section 504 that provides salary deposit information for an employee, including a most recent deposit date 506 and a next deposit date 508, as shown. A view pay stub link 510 may be provided to display detail of the paycheck or other salary statement of the employee. Also, a view payroll calendar link 512 may be configured to display a calendar view of pay days, deposit dates, or other salary-related events. In various embodiments, a direct deposit section 514 may be included within the compensation panel 502 to display specific accounts to which salary payments have been or will be directed. The compensation panel 502 may also include information related to the equity or other long-term incentive packages offered to an employee, such as stock options or stock-related bonuses, for example.

A salary detail section 516 may be provided which includes a graphical display 518 illustrating gross salary compensation, tax deductions, and other deductions associated with the paycheck of the employee. The display 518 may be configured for segmentation into portions including a net pay sub-section 518A (e.g., the amount of salary remaining after deductions); a tax deduction sub-section 518B (e.g., federal taxes withheld, state taxes withheld, local tax, social security tax, among others); and, an additional deduction sub-section 518C. In various embodiments, the portions and sub-sections 518A, 518B, 518C may be segmented into a circular format or may use nested concentric circles, for example, for display purposes. Examples of additional deductions include health-related deductions (e.g., medical, dental and vision); life/accident insurance; disability insurance; reimbursements (e.g., health care reimbursement accounts, health savings accounts, dependent care reimbursement accounts, and parking/transportation); contributions to 401(k) accounts; charitable donations; and many other types of deductions.

The display 518 may be configured so that use of an access device (e.g., a mouse, a finger, or other pointing device) can highlight various sub-portions within the sub-sections. In the example shown, the life insurance deduction sub-portion of the additional deduction sub-section 518C has been selected. The dollar amount associated with the life insurance deduction is then displayed in text format on the display 518. In certain embodiments, a matching amount may be presented in connection with various dollar amounts or other financial values described herein. The matching amount may represent a contribution made to the employee's finances by an employer, for example, such as in the context of an investment account, a financial account, or other benefit accounts of the employee. In certain embodiments, the matching amount may represent a contribution to an employee's benefits, such as a medical plan or an insurance plan. In various embodiments, a view earning history function 520 may be accessed to display historical salary information for the employee. Also, a tax profile function 522 may be provided for accessing and displaying more detailed summaries of taxes paid by the employee in connection with salary compensation.

Figure 6A:
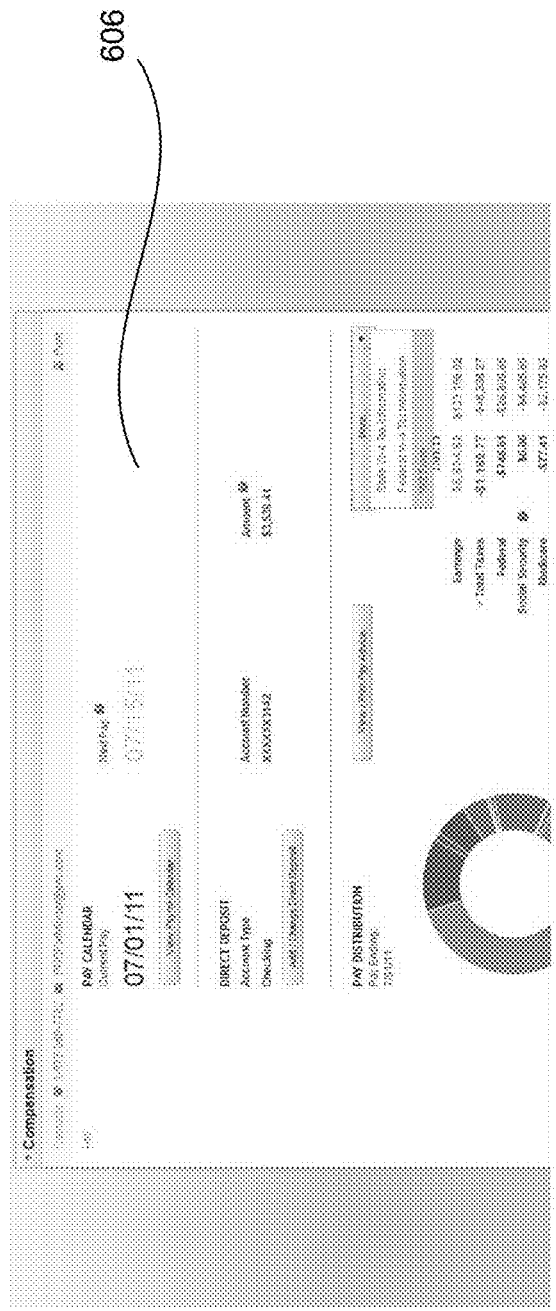
FIGS. 6A through 6D include screen displays that illustrate examples of aspects of a compensation panel that may be generated by a human resources information management system.
Figure 6B:
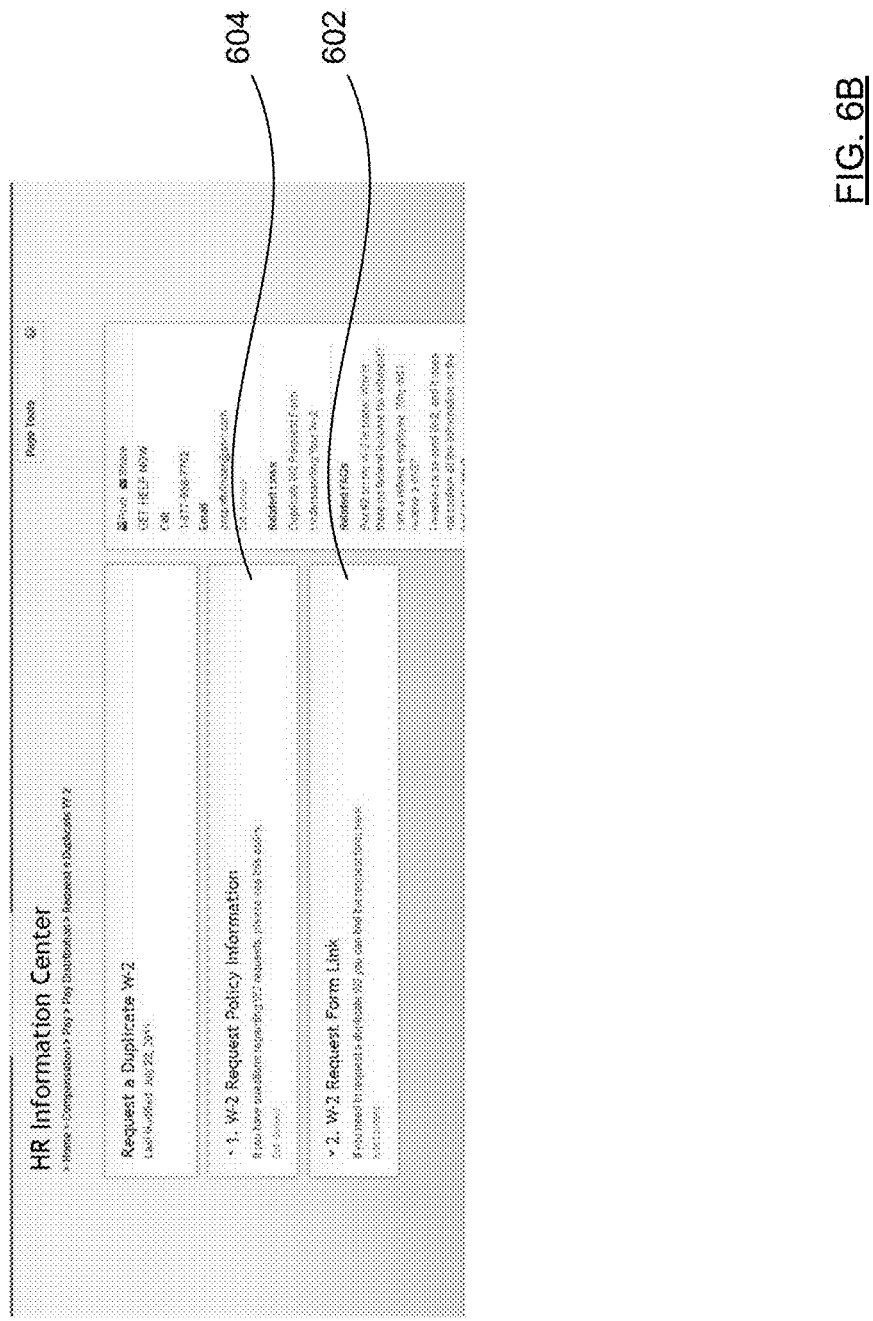
Figure 6C:
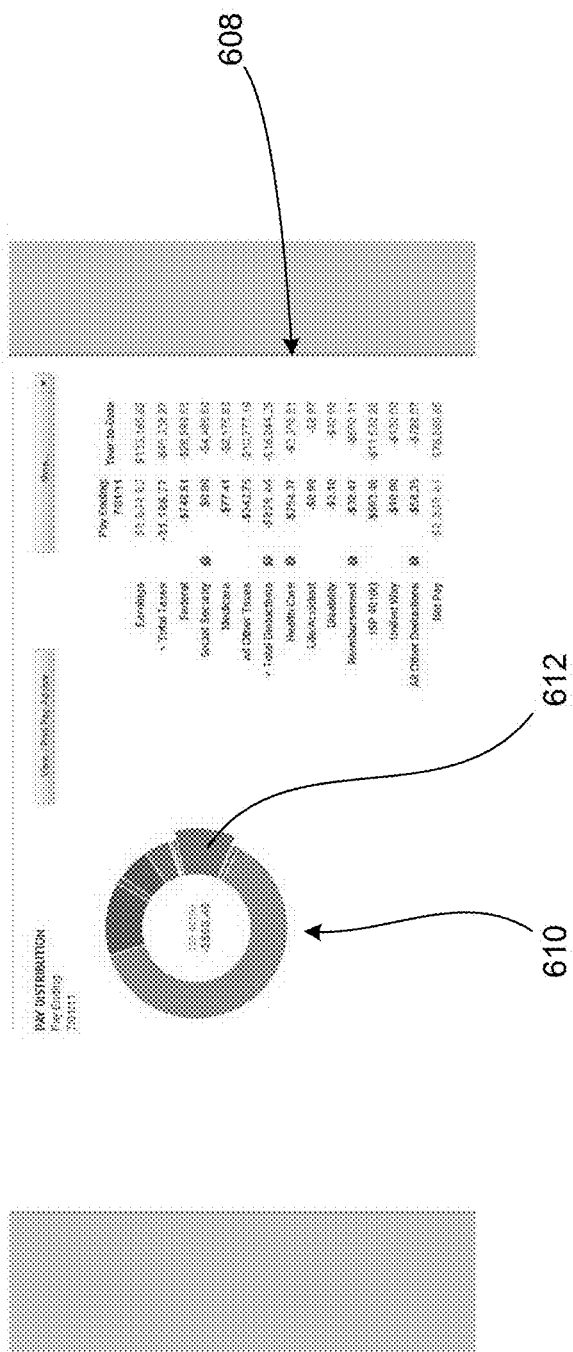
Figure 6D:
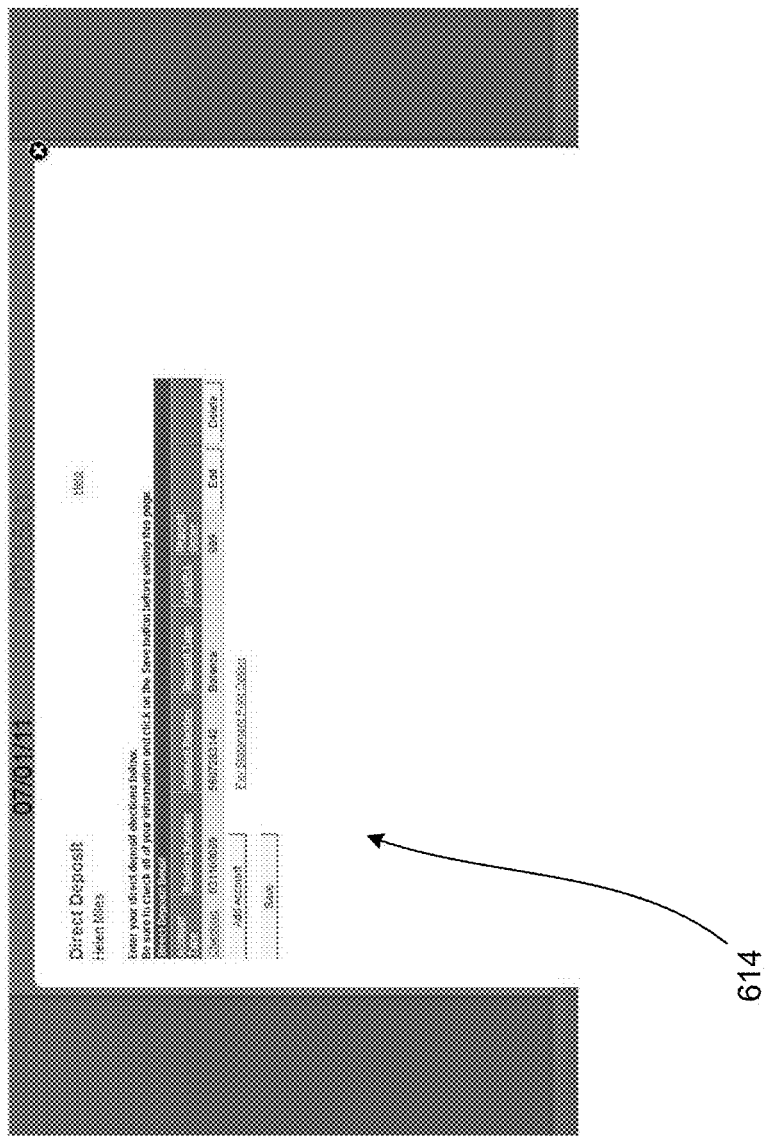

As shown in the screen displays of FIGS. 6A and 69, the management system 201 can be configured to allow a user to request a duplicate copy of a W-2 form, for example, among other tax-related documents, through a request link 602. In addition, a policy information link 604 can be provided, as shown in FIG. 6B. In certain embodiments, a menu option can be provided to facilitate changes in tax data through a user selection (e.g., a mouse click). With reference again to FIG. 6A, a pay calendar section 606 of the compensation panel may include an alert or other communication in the event that a salary payment made to the employee represents an off-cycle paycheck. FIG. 6C illustrates an example of a pay distribution section 608 of a compensation panel. It can be seen that the graphical display 610 illustrating salary information can be configured so that accessing numerical information associated with a sub-section or sub-portion of the display 610 (e.g., sub-section 612) with an access device can physically transform the sub-section 612 for highlighting purposes. In the example shown, when numerical data for the "ISP 401(k)" data category is selected, the sub-section 612 may become enlarged or "pop out" from the display 610. FIG. 6D illustrates an example of a user interface 614 that can be programmed to allow a user to modify compensation information, such as direct deposit related information, for example. The user interface 614 may include data derived from one or more data sources operatively associated with the management system 201, such as various "PeopleSoft" systems, for example.

Figure 7:
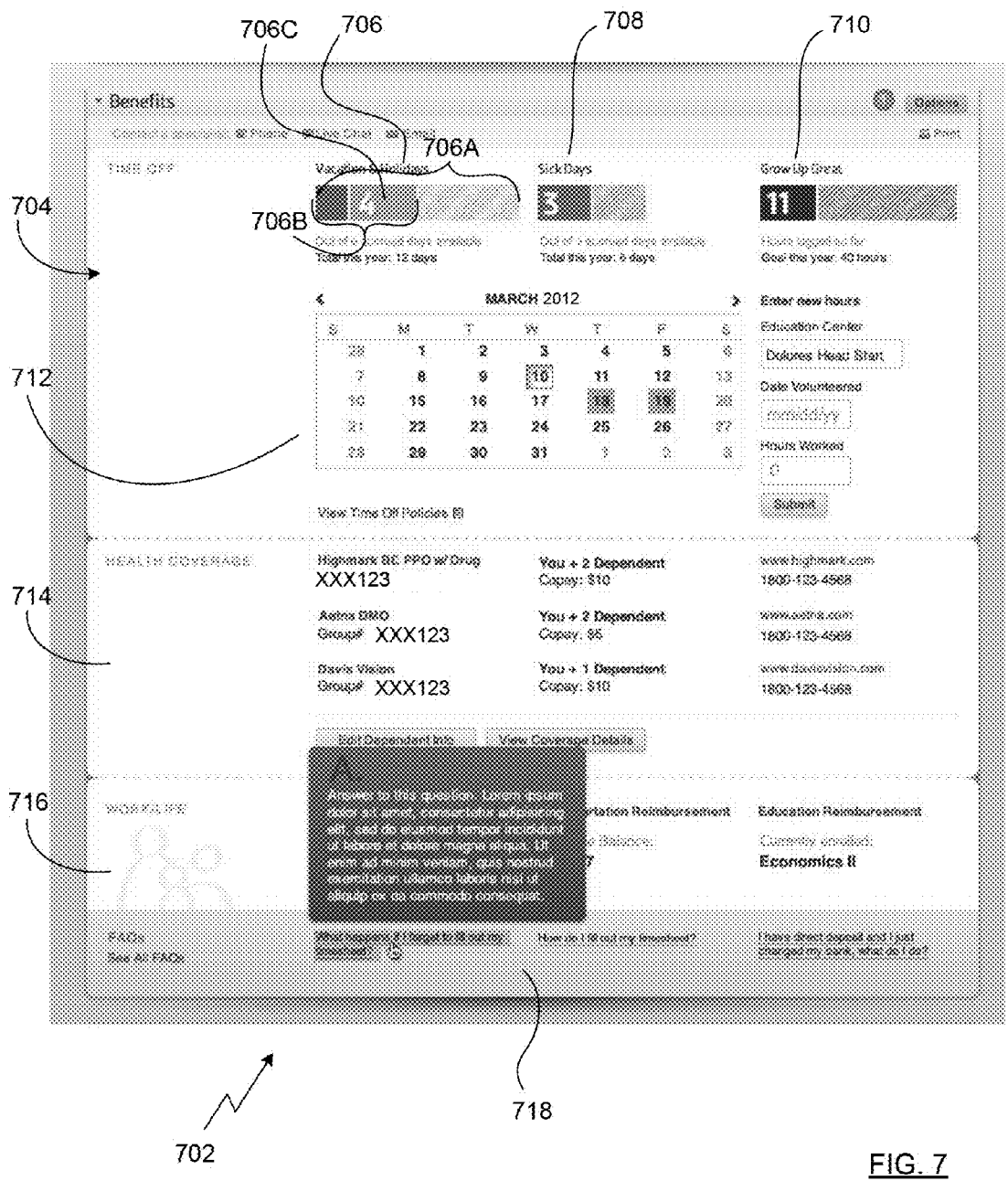
FIG. 7 includes a screen display which illustrates an example of a benefits panel that may be generated by a human resources information management system.

FIG. 7 illustrates an example of a benefits panel 702 that can be configured in accordance with various embodiments of the invention. In this example, the benefits panel 702 includes a time off section 704 that provides graphical indications to the user 204 of vacation and holidays 706, personal and floating holidays 708, and volunteer time 710. The vacation, personal days, and holidays display 706 includes the total days available for the year for vacation, personal days and holidays shown in section 706A, the days taken 706B, and the remaining days yet to be taken shown in section 706C. A like configuration can be presented for the personal and floating holidays display 708. The volunteer time display 710 may present time completed for volunteer or charity events, for example, as compared to a goal for total hours for a predetermined time period. In various embodiments, a calendar 712 may be provided to display or highlight dates applicable to vacation, holidays, personal days, floating holidays, volunteer days, or other time off by the employee.

Figure 8A:
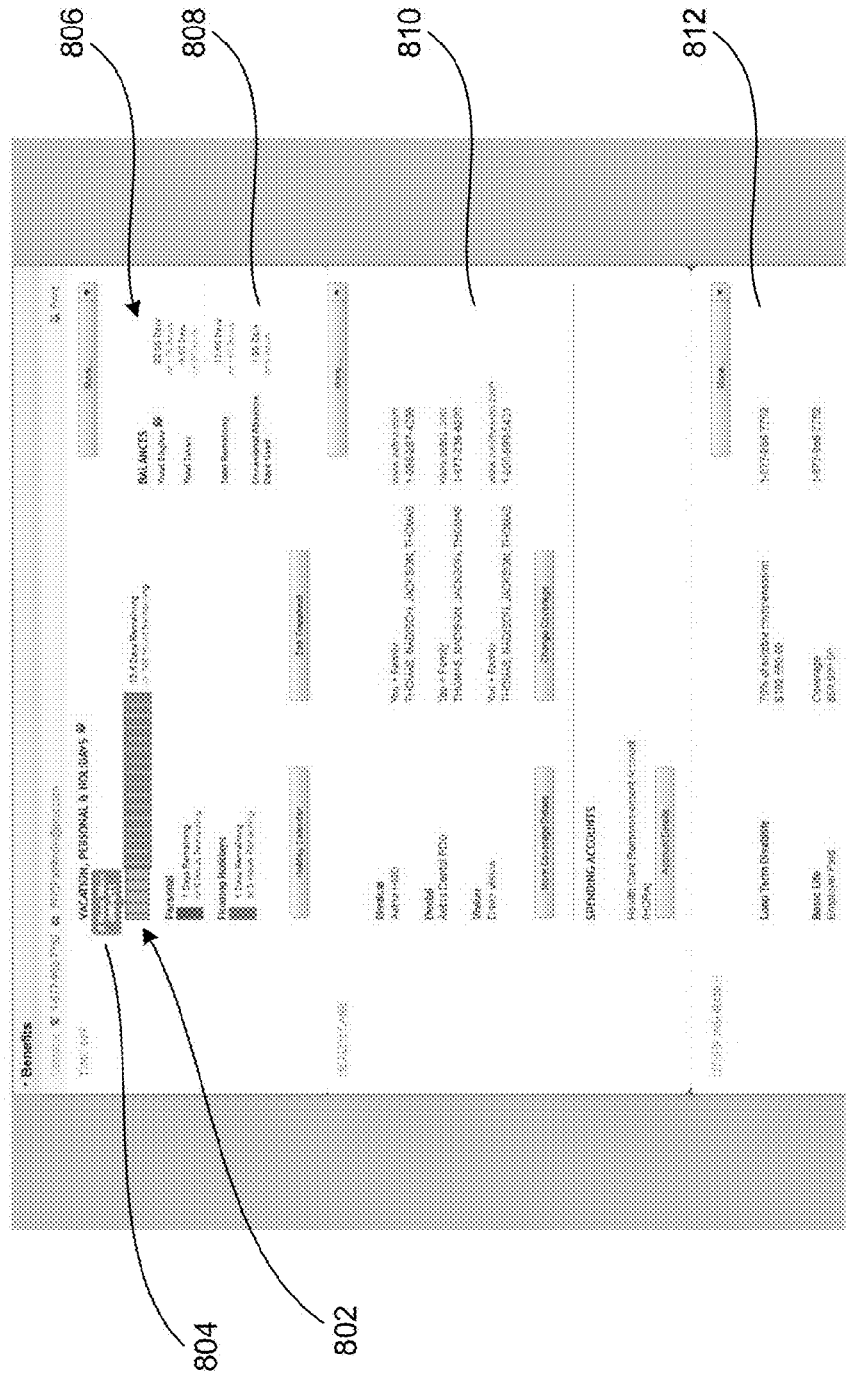
FIGS. 8A through 8E include screen displays that illustrate examples of aspects of a benefits panel that may be generated by a human resources information management system.
Figure 8B:
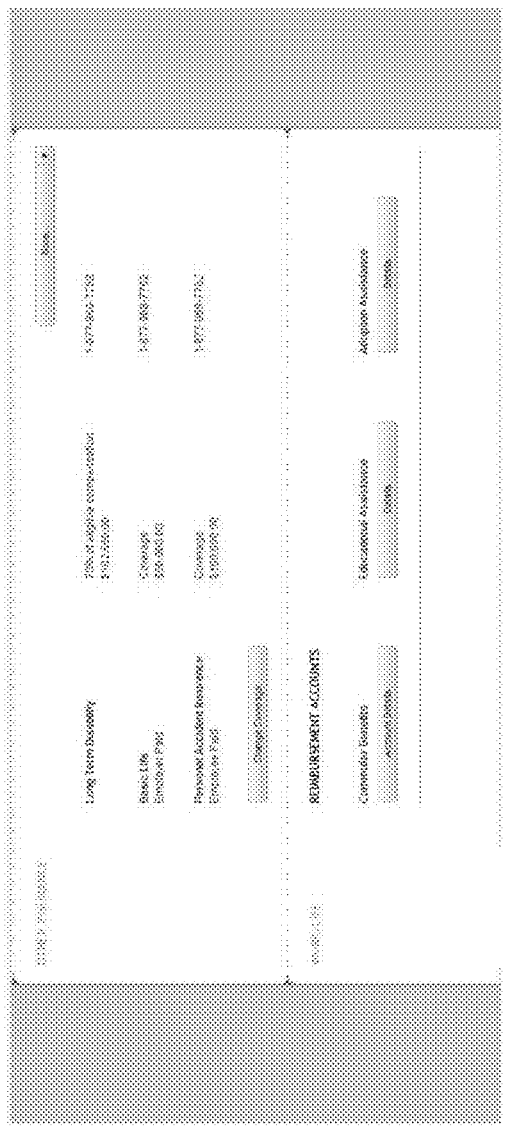
Figure 8C:
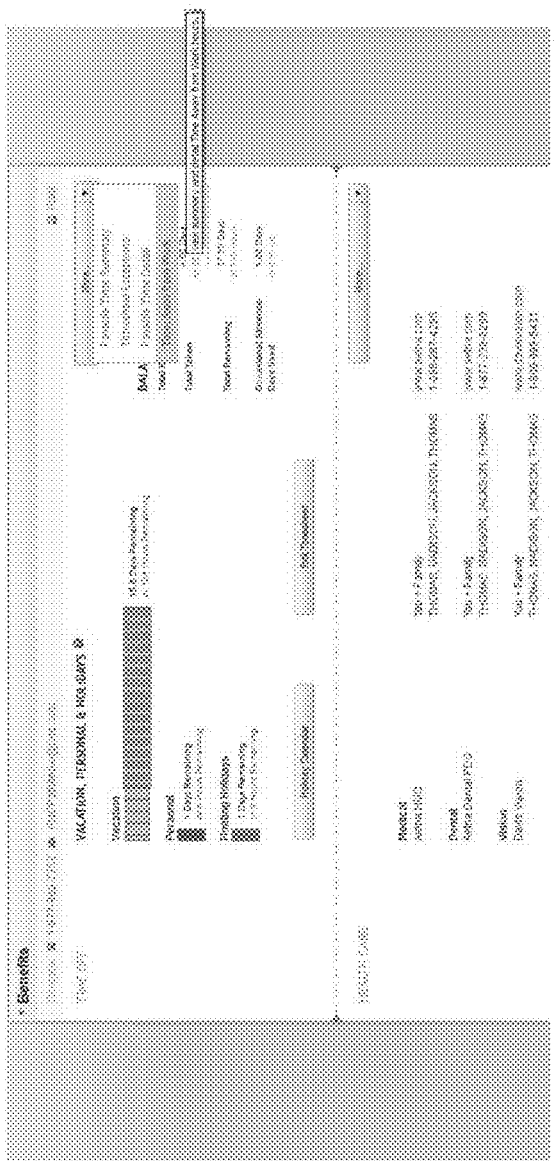

With reference to FIGS. 8A through 8C, it can be seen that applying an access device to certain graphical portions of a benefits panel may cause the selected portion to be highlighted. For example, applying an access device to a portion of a vacation, personal and holidays graphical display 802 may cause a bubble 804 to be displayed that includes a date when time off was taken and how many hours were taken that day. In certain embodiments, a balances section 806 may be provided that tracks time off such as occasional absence time 808, for example. Also, time representing vacation days, personal days, and floating holidays can be translated into hours or other time increments to account for employees who do not necessarily work a standard eight-hour day such as part-time or flex-time employees, for example. In various embodiments, the benefits panel may include a conditional link for scheduling future time off. The link may be conditional to the extent that time off is or is not available to the employee, for example.

A health coverage section 714 may be included within the benefits panel 702, including a summary of medical, dental, pharmacy, or vision plans in which the employee participates. A work/life section 716 of the benefits panel 702 may include summary information for reimbursements expected by the employee for transportation or education expenses, for example. In various embodiments, a frequently-asked-question ("FAQ") section 718 may be included within the benefits panel 702 (as well as within the various other panels described herein) with FAQs focused on or related to the panel topic. For example, the FAQs shown in FIG. 7 relate to issues associated with benefits (e.g., timesheet issues).

Figure 8D:
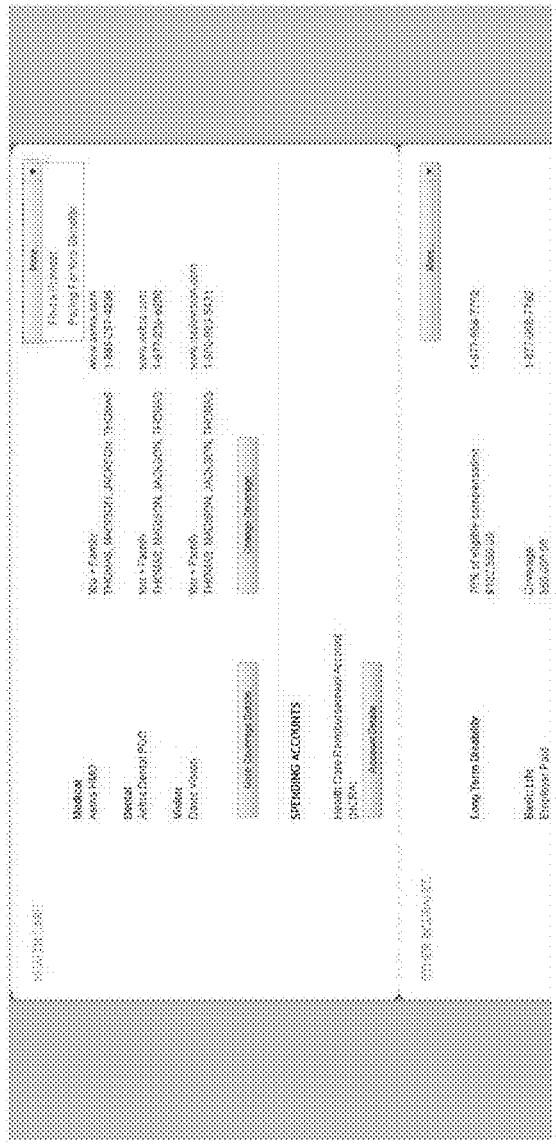
Figure 8E:
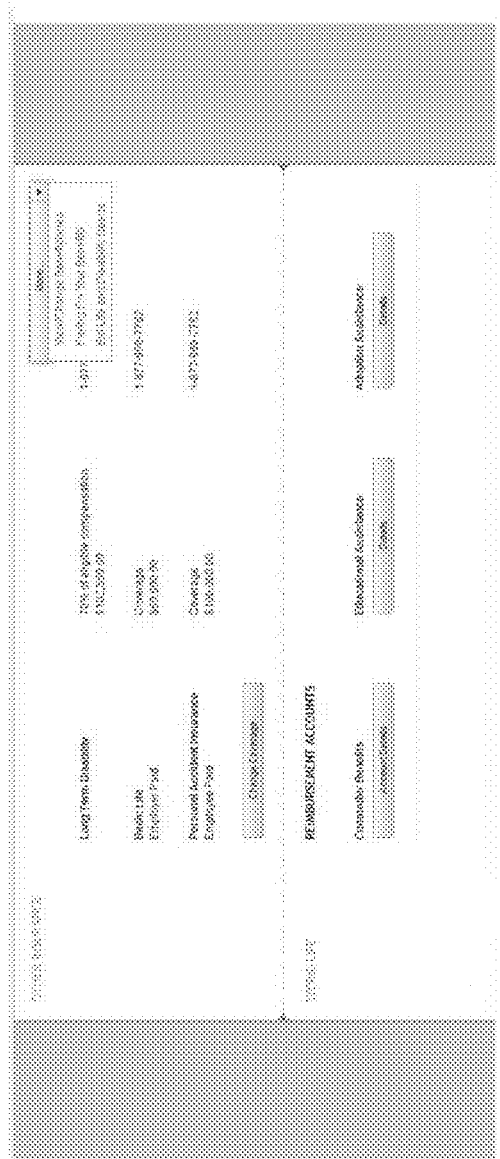

With regard to FIG. 8B, in another example, a health care section 810 may include data or links associated with health care reimbursement accounts, health savings accounts, and/or post retirement medical accounts. Also, an other insurance section 812 may include data or links associated with insurance accounts such as disability insurance, basic life insurance, personal accident insurance, or other types of insurance. FIGS. 8C through 8E illustrate example menu options presented for user selection when a "More" option has been selected on various portions of the benefits panel.

Figure 9:
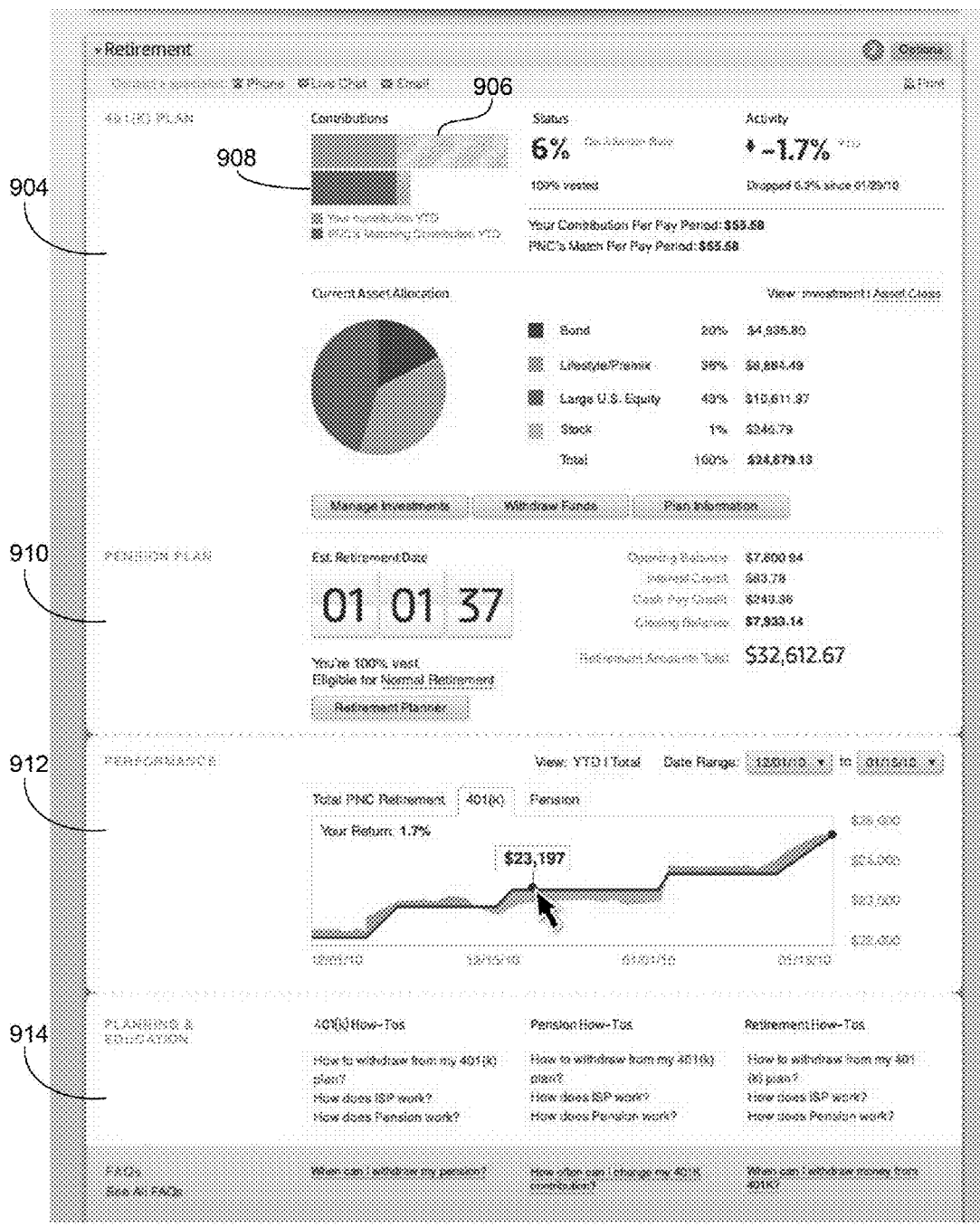
FIG. 9 includes a screen display which illustrates an example of a retirement panel that may be generated by a human resources information management system.

FIG. 9 illustrates an example of a retirement panel 902 that can be configured in accordance with various embodiments of the invention. In various embodiments, the retirement panel 902 may include a retirement account section 904 that includes a summary of employee and employer contributions to a 401(k) account, for example. The retirement account section 904 may include a graphical depiction 906 of total expected employer and employee contributions expected for a predetermined time period at a given contribution rate, along with a graphical depiction 908 of currently accrued employer and employee contributions. Also, a current asset allocation can be calculated and displayed for assets in the retirement accounts of the employee. A pension plan section 910 provides summary data for pension plans in which the employee may participate through the organization, including performing calculations based on an estimated retirement date for the employee. A performance section 912 can be provided that displays performance data for one or all of the retirement accounts or the pension plan. In certain embodiments, a user may be permitted to modify a date range or specify benchmark data in connection with one or more retirement accounts. A planning and education section 914 may be configured to provide FAQs or links to informational references for various retirement or pension related topics.

Figure 10A:
FIGS. 10A through 10E include screen displays that illustrate examples of aspects of a retirement panel that may be generated by a human resources information management system.
Figure 10B:
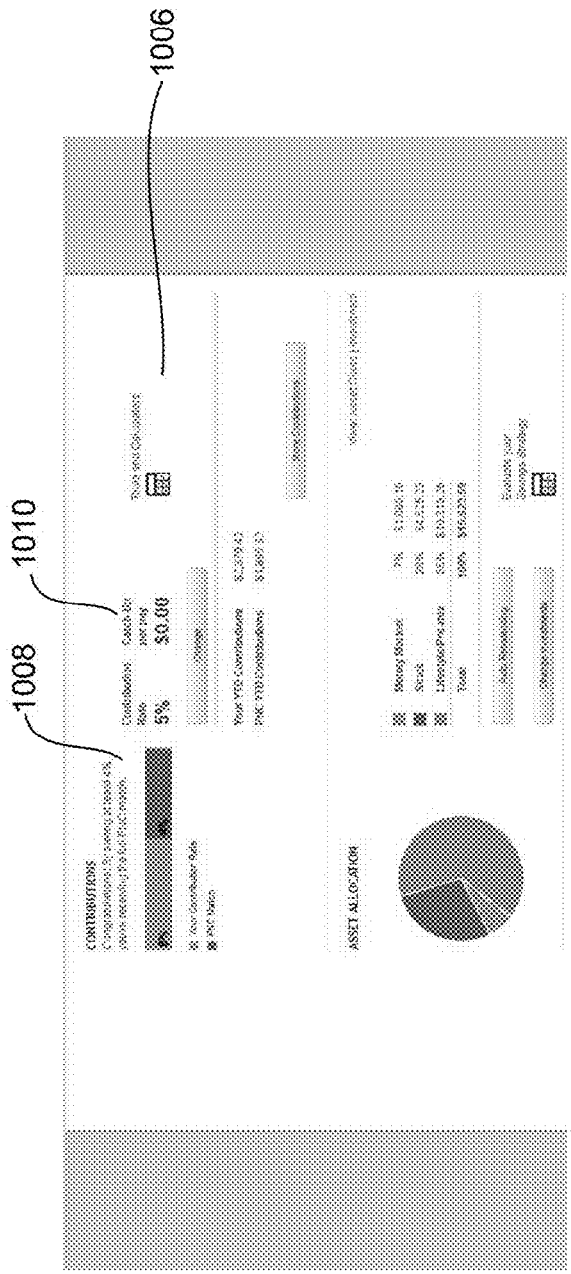

With reference to FIGS. 10A through 10E, further examples of aspects of a retirement panel are provided. As shown in FIG. 10A, a balances section 1002 provides a summary bar graphical display 1004 that can be configured to reflect a total investment account value. In certain embodiments, the graphical display 1004 can be programmed to transform or highlight a sub-section of the display 1004 that has been selected by the access device of a user, for example. As shown in FIG. 10B, in a contributions section 1006, a graphical display 1008 can be provided that is programmed to include contribution rates for both all employer and the employee, such as contributions to an investment account, for example. In certain embodiments, an opportunity for an additional employer matching contribution may be displayed. For example, if an employee is contributing 3% of her salary to an investment account, and the maximum employer matching contribution is 4% of that salary, then an additional bar can be added to the display 1008 to represent the 1% matching contribution that the employee is not presently receiving from the employer. In certain embodiments, a catch-up contribution data field 1010 may be presented in association with any relevant catch-up contributions that may be deducted from the salary of an employee.

Figure 10C:
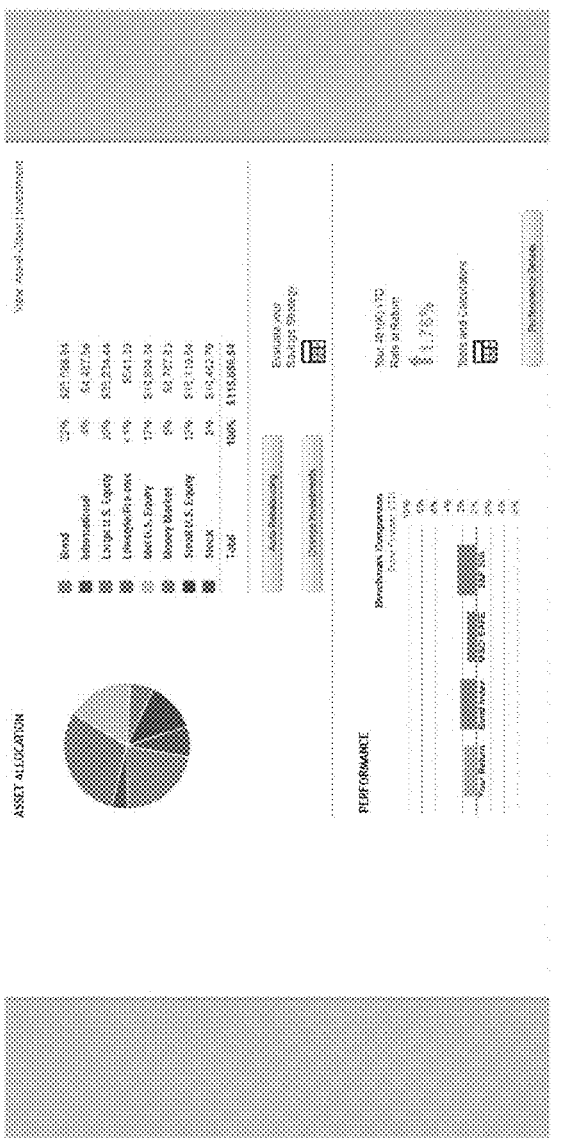
Figure 10D:
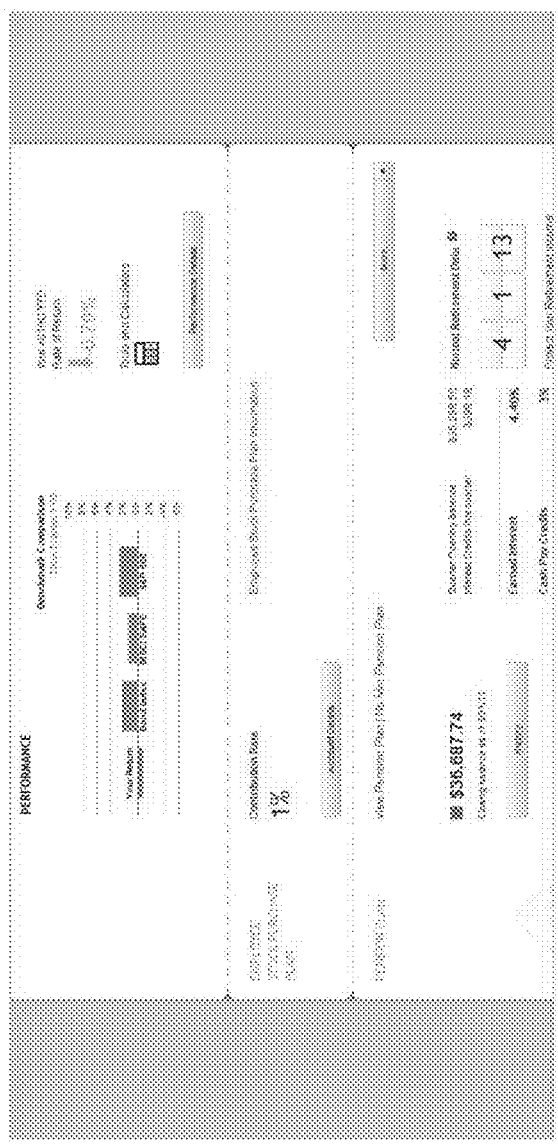
Figure 10E:
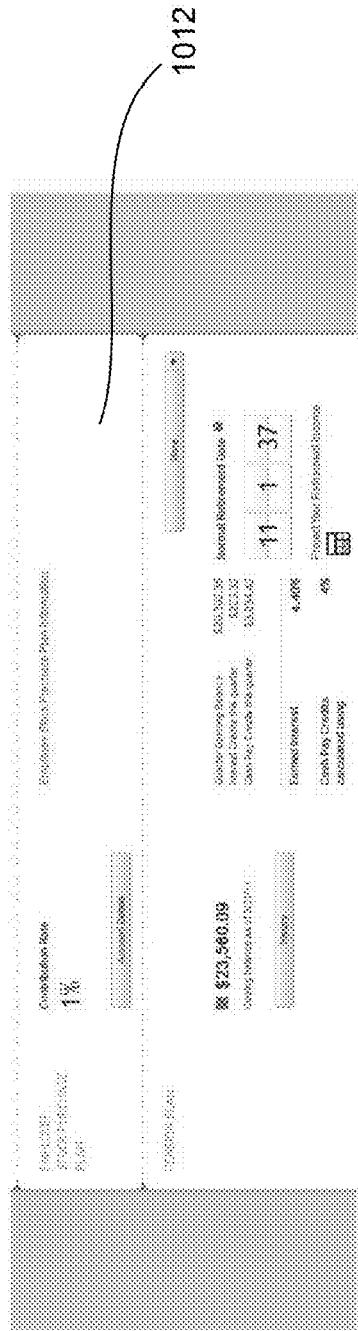
Figure 11:
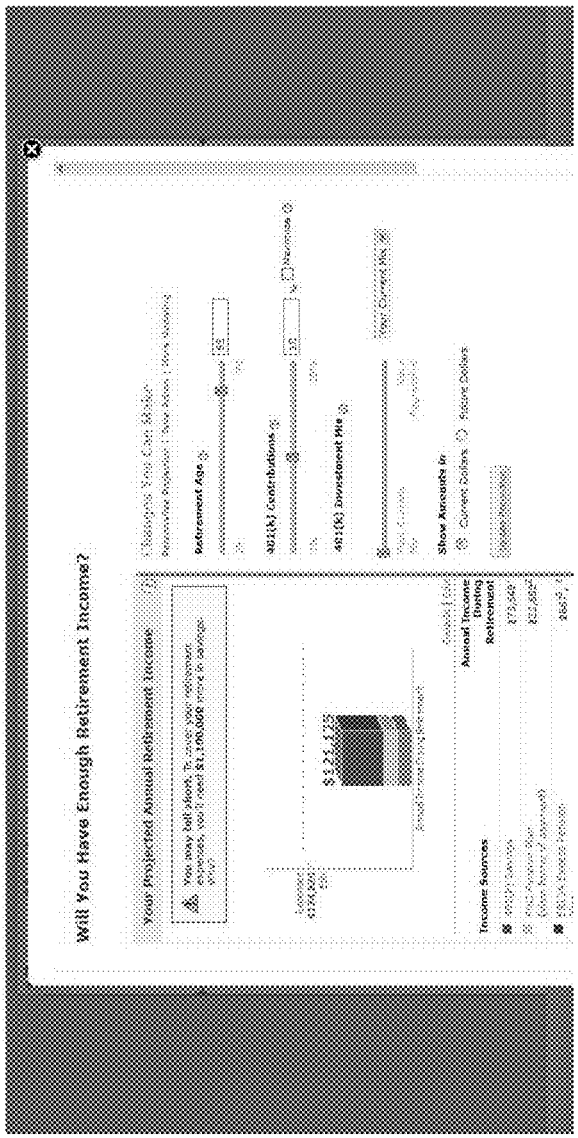
FIG. 11 illustrates an example of how a calculator or modeling tool can be accessed and presented to a user through a retirement panel.

With regard to FIGS. 10C through 10E, a toggle feature can be provided that allows a user to obtain different views of various retirement and investment accounts or pension plans. For example, asset class versus investment class can be alternatively presented, or multiple pension plans can be dewed instead of investment accounts. As shown in FIG. 10E in certain embodiments an employee stock purchase plan section 1012 may be presented on the retirement panel. FIG. 11 illustrates an example of ho calculator or modeling tool (e.g., a "Hewitt" tool) can be accessed and presented to a user through the retirement panel.

Figure 12:
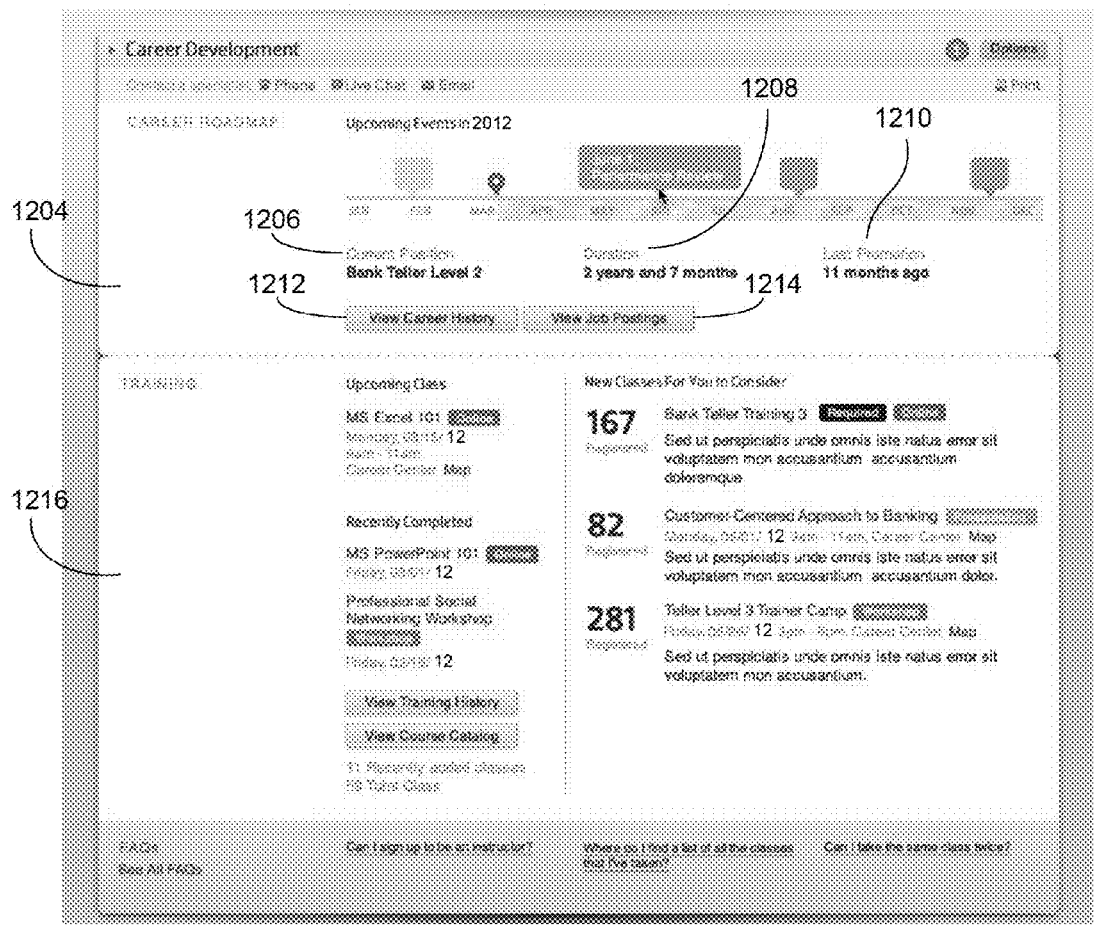
FIG. 12 includes a screen display which illustrates an example of a career development panel that may be generated by a human resources information management system.

FIG. 12 illustrates an example of a career development panel 1202 that can be configured in accordance with various embodiments of the invention. In various embodiments, the career development panel 1202 may include a career roadmap section 1204 with a timeline that highlights upcoming dates or events for an employee in response to various factors such as current position 1206, duration of position 1208, or last promotion 1210, among many others. In the example shown, a date of June 1 is highlighted as a performance review date for the employee. In certain embodiments, a view career history function or ink 1212 may be provided to display other positions which the employee has held in the past within the organization, for example. Also, a view, job postings function or link 1214 can be included within the career development panel 1202 to facilitate the employee identifying other opportunities for advancement or different positions within the organization.

A training section 1216 of the career development panel 1202 may provide information regarding upcoming classes in which the employee has been scheduled to participate. In certain embodiments, a list of recently completed classes may be displayed for the employee. Also, new classes for the employee to consider may be displayed in the training section 1216. The new classes may be selected by the system 201 and presented in response to a new position that the employee has identified for future placement or promotion within the organization. In this example, the current position of the employee is "Bank Teller Level 2" and a required class for "Bank Teller Level 3" has been selected for display in the training section 1216. As shown, the system 201 may also designate classes as required or optional with regard to a new position desired by the employee or recommended by the system 201.

Figure 13A:
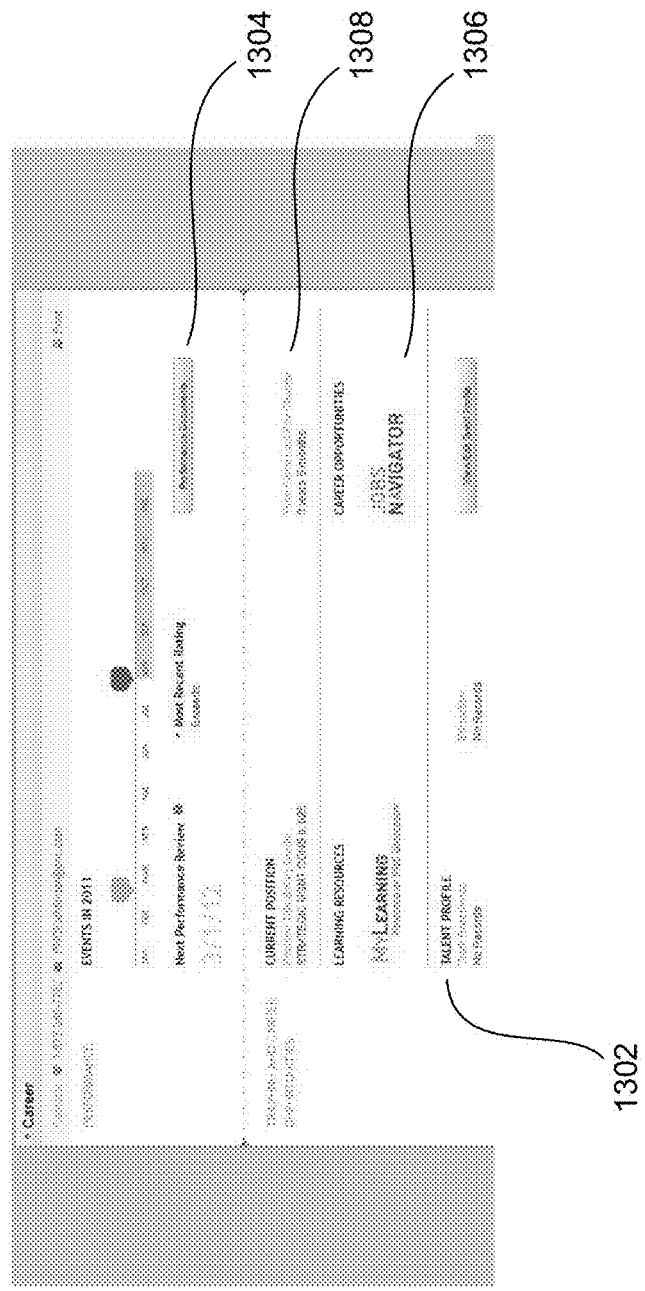
FIGS. 13A and 13B illustrate examples of a talent profile section provided in connection with a career development panel.
Figure 13B:
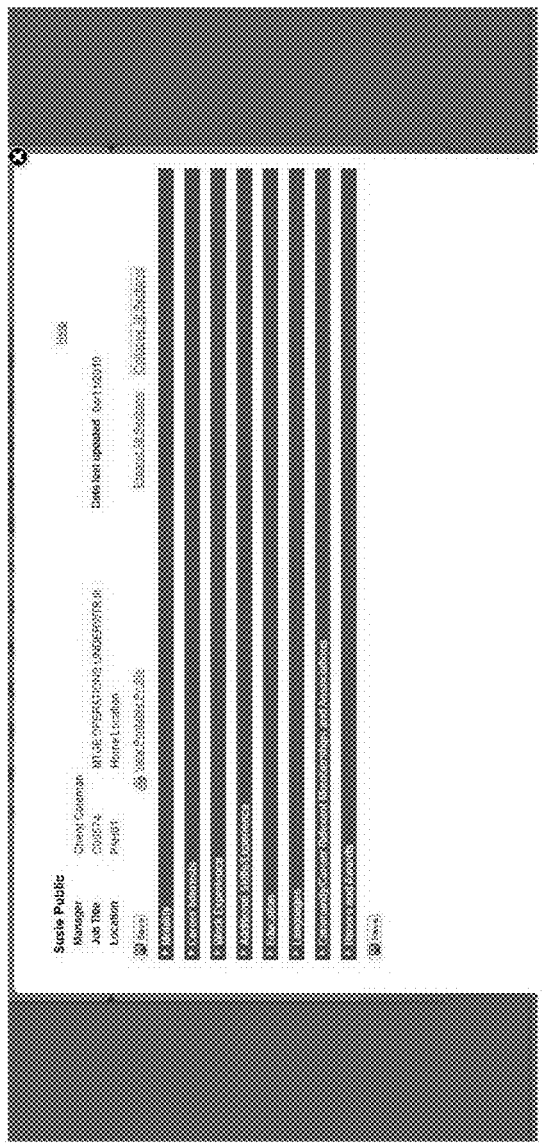

In another example of the career development panel, and with reference to FIG. 13A, a talent profile section 1302 can be provided that includes records associated with the work experience and/or education of the employee. Selection of a performance documents link 1304 provides access or information illustrated in the screen display of FIG. 13B. The link 1304 may access one or more modules or data storage media of a performance management system, for example, as an external account 222 in which performance reviews are administered to employees. In certain embodiments, a job navigator link 1306 may allow the employee to access a location in which one or more employment positions or other jobs are posted. In various embodiments, a time since last pay change data field 1308 may be provided to reflect changes associated with the salary of an employee.

Figure 14:
FIG. 14 illustrates an example of a screen display that may result from selecting an "options" function provided on one or more panels described herein.

FIG. 14 illustrates an example of a screen display 1402 that results from selecting an "options" function on various panels as described herein. In the example shown, the options function has been accessed on a benefits related panel. The screen display 1402 may include policies, forms, guidelines, summaries of plans, or other information associated with the current information summarized by a given panel. For example, the system 201 may display options for the employee to consider regarding health coverage and has recommended various options that would be beneficial for the employee (e.g., wellness initiative and health savings account). The option of health savings account, for example, may have been recommended because the employee is planning to take a leave of absence for oral surgery but does not currently have dental insurance and is not currently enrolled in a health savings account.

Figure 15:
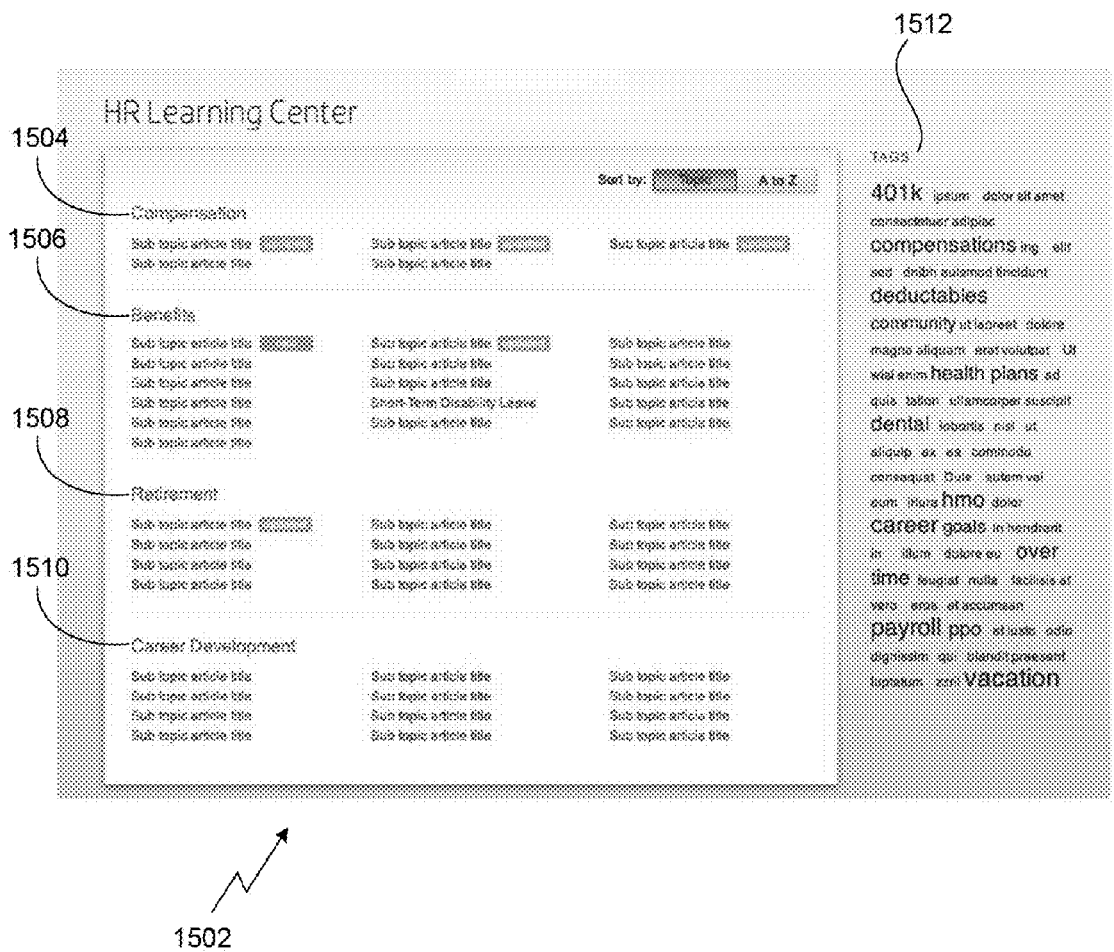
FIG. 15 includes an example of a screen display that may be generated by execution of a learning center module of a human resources information management system.

FIG. 15 includes an example of a screen display 1502 that may be generated by execution of the learning center module 206G within the human resources information management system 201. In various embodiments, the learning center module 206G may be a central location for facilitating access to one or more data storage media which include human resources related content that would be of interest to employees and other personnel associated with the organization. The content on the screen display 1502 may be organized by a hierarchy depending on the various panels 1504, 1506, 1508, 1510 employed by the system 201 (e.g., compensation, benefits, retirement, and career development). As shown, content related to the compensation panel 1504 may be displayed first, because the compensation panel 1504 may have been used as the entry point for accessing the learning center module 206G. In various embodiments, content can be searched and uncovered by using a tag cloud 1512 associated with the screen display 1502. Clicking on a term or phrase within the tag cloud 1512 initiates a search for content within the system 201 and causes search results associated with the term or phrase to be displayed in one or more of the panel sections 1504, 1506, 1508, 1510. For example, selecting the term "401k" within the tag cloud 401k would provide search results including instances of "401k" appearing in content related to compensation, benefits, retirement, and career development. Such content may include, for example, articles, forms, web site links, procedures, policies, laws, or regulations that include the selected search term.

Figure 16:
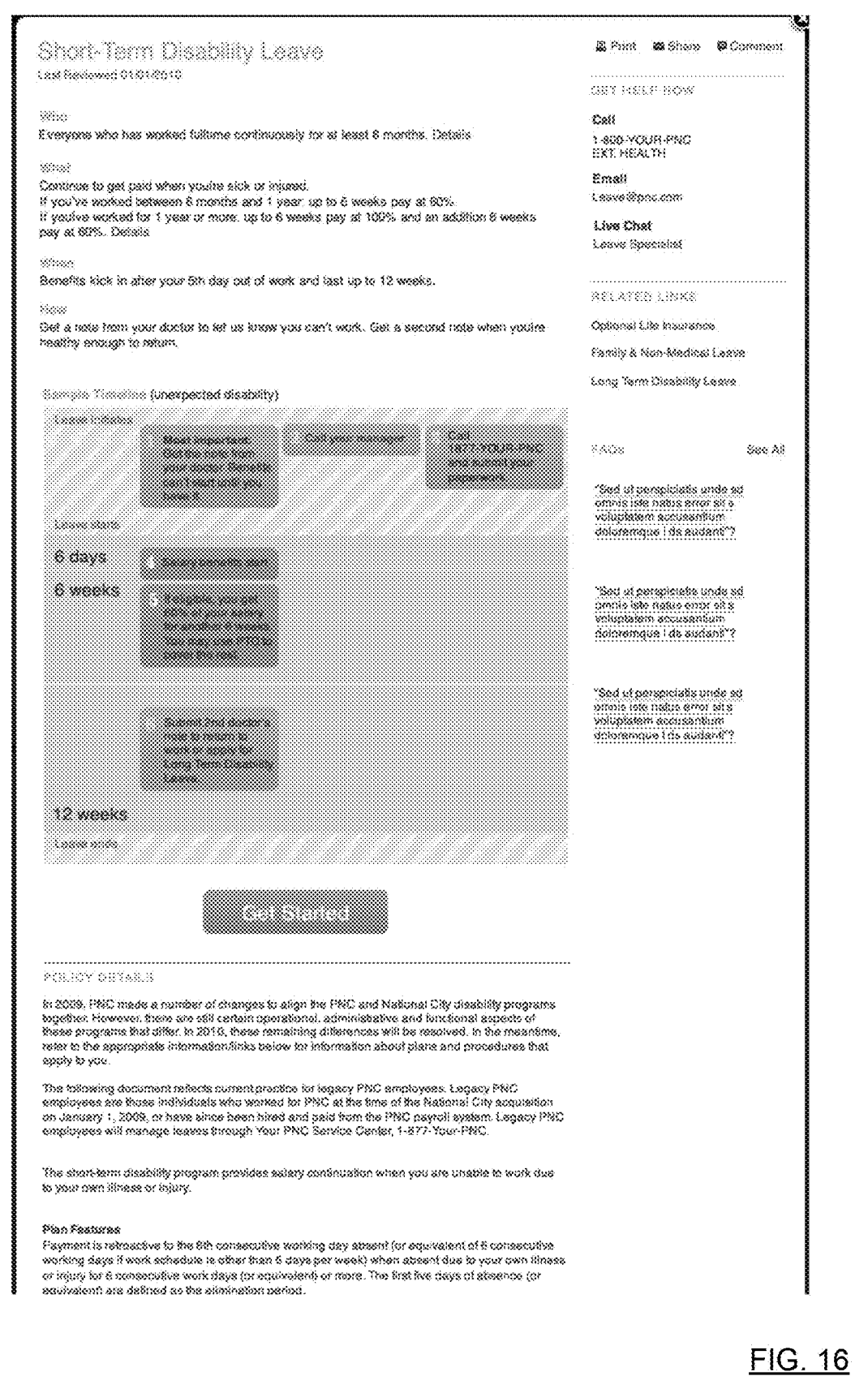

In various embodiments, terms or phrases that have a comparatively higher frequency of instantiation or characterization within various pieces of content than other terms or phrases are displayed in comparatively larger font than the other, less frequently instantiated terms or phrases. For example, it can be inferred that the term "401k" has been searched more frequently or has been otherwise instantiated more frequently than the term "ppo" based on the comparative sizes of the two terms as displayed within the tag cloud 1512. In certain embodiments, the size or other highlighting for a search term may be a function of the relative importance of that search term as defined by an employer, for example. FIG. 16 includes an example of a policy that may be accessed through various links provided within the management system 201, including the learning center module 206G, for example.

Figure 17A:
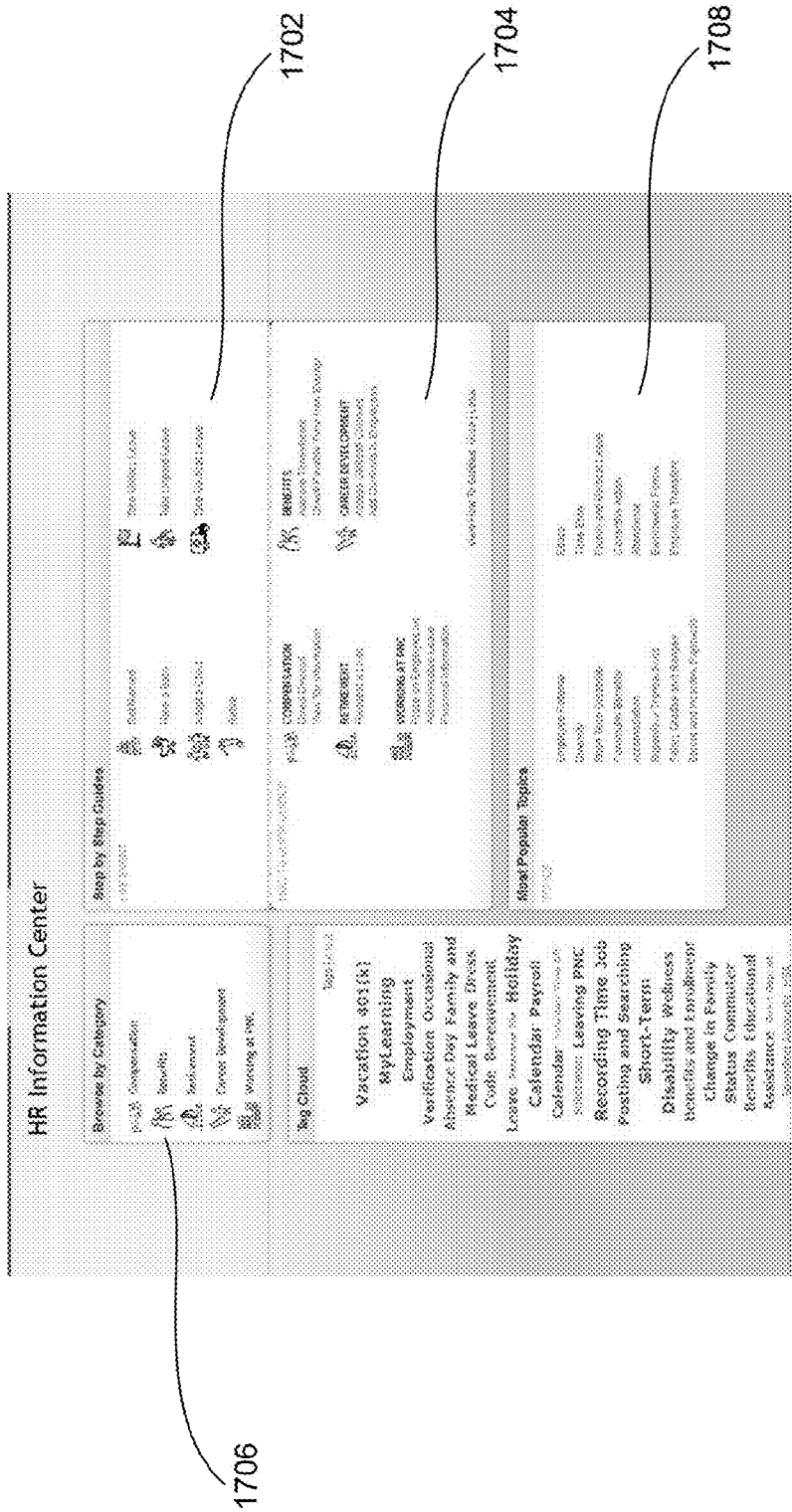
FIGS. 17A through 17E illustrate examples of aspects of a human resources information center that may be accessible by users through a human resources information management system.
Figure 17B:
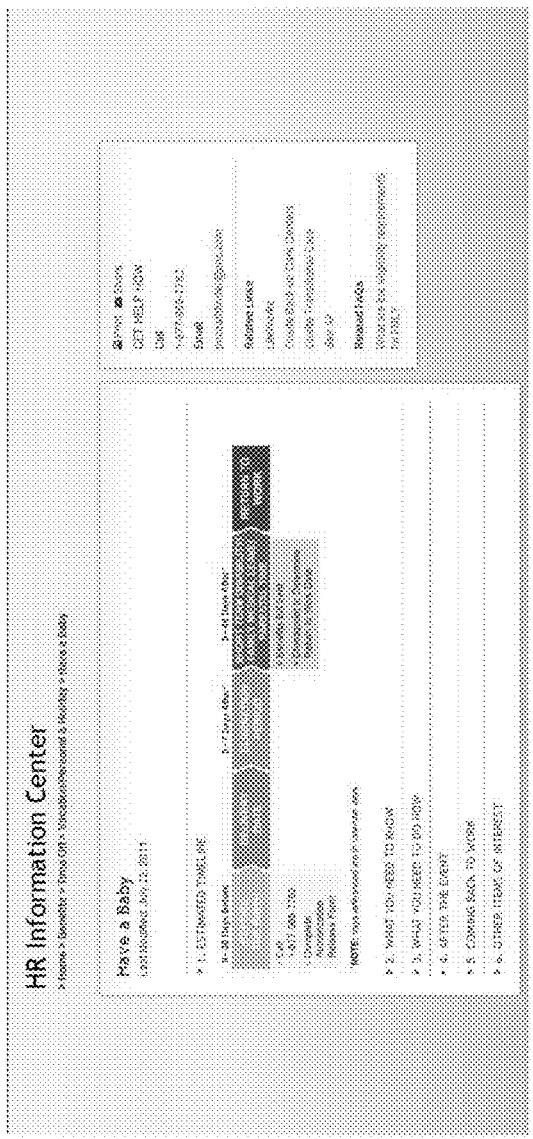
Figure 17C:
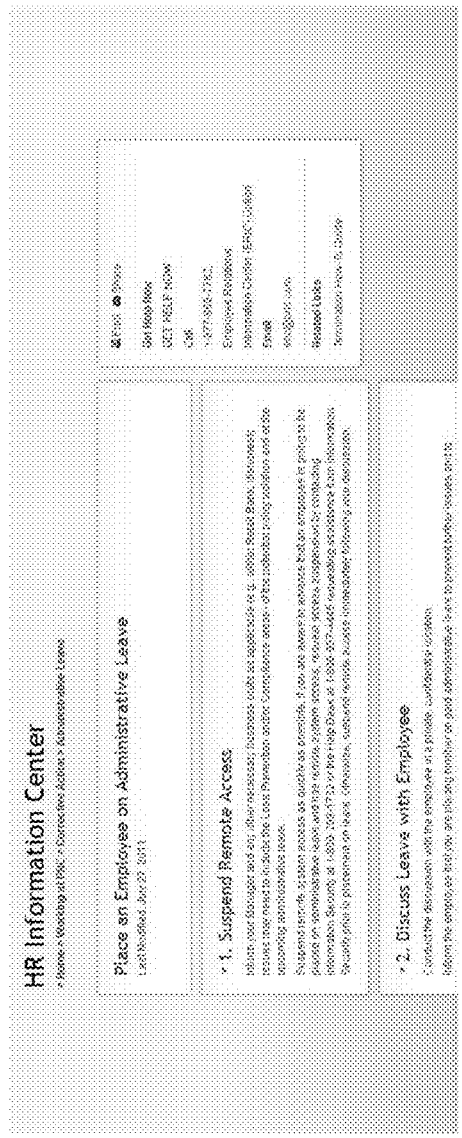
Figure 17D:
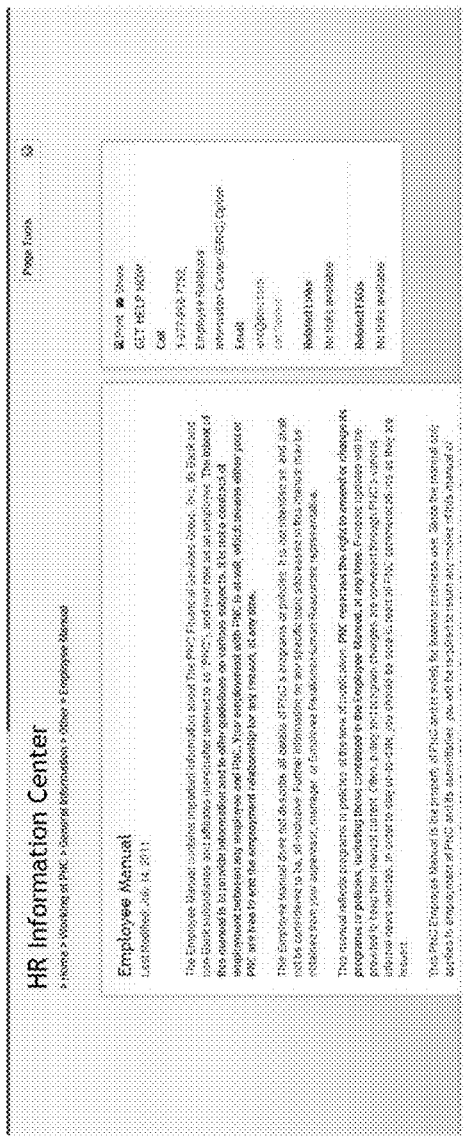
Figure 17E:
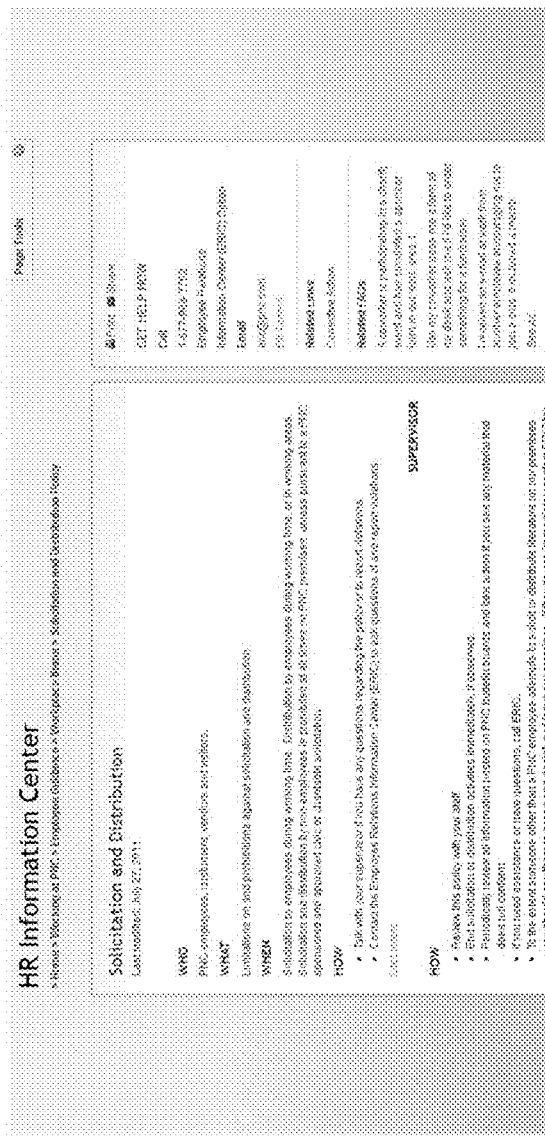

FIGS. 17A through 17E illustrate examples of aspects of a human resources information center that may be accessible by users through the management system 201. As shown in FIG. 17A, the human resources information center may include links to one or more step-by-step guides 1702. The step-by-step guides 1702 may include various topics and address the fact that life events may be multi-step processes that span multiple areas such as payroll, benefits, insurance, or other areas. In certain embodiments, each step-by-step guide 1702 can include all areas that might affect the employee for a given topic, including relevant links to applicable forms, timelines, or other information. An example of a step-by-step guide 1702 is shown in FIG. 17B. A how-to quick guide 1704 provides guidance on a multi-step process that is more basic nature compared to a step-by-step guide 1702, involving perhaps only two or three steps involving a single form or due date. An example of a how-to quick guide is shown in FIG. 17C. In certain embodiments, a browsing function 1706 (e.g., a "Browse by Category" function) can be provided to allow a user to drill down through a folder structure, for example, to locate desired information. In various embodiments, a human resources group of the employer may define a set of most popular topics 1708 (see FIG. 17A) deemed to be important to highlight for employees as possible search terms. As shown in FIG. 17D, in certain embodiments employees may be permitted to print a copy of an employment manual, for example, from the management system 201. In various embodiments, with reference to FIG. 17E, content may be displayed based on the status of a particular user who has accessed the management system 201 to view the content. For example, a supervisor may be permitted to view more company-sensitive information in comparison to an employee who reports to the supervisor as a subordinate. Such information may be highlighted in various ways (e.g., different font style or color) to confirm that the information is accessible only at the status level of the current viewer and not necessarily viewable or accessible by all users of the system 201.

Figure 18:
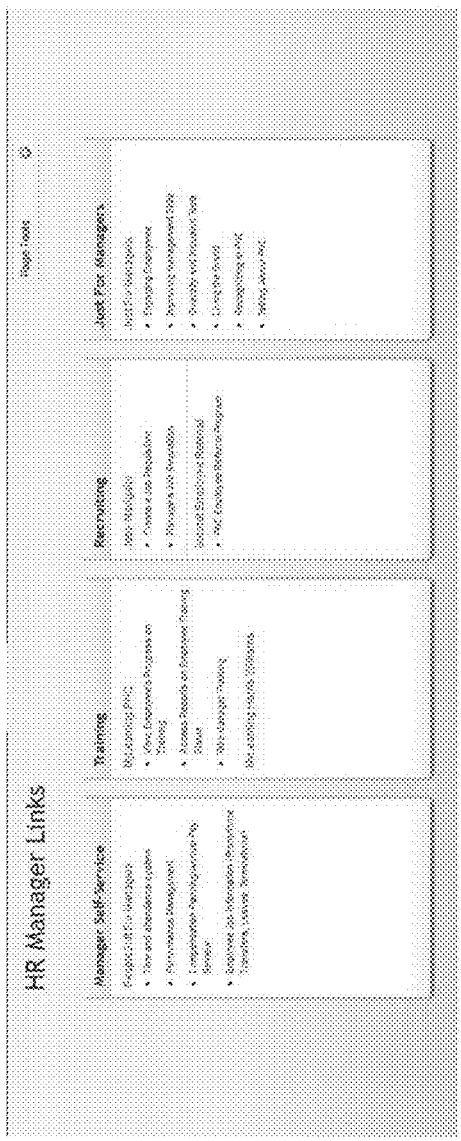
FIG. 18 illustrates an example of how the human resources information management system may be programmed to display links to a manager.

In various embodiments, with reference to FIG. 18, the management system 201 may be programmed to display one or more human resources manager to links to a manager of the employer or other appropriately authorized person. As shown, the display may include one or human resources information links that are required or useful for a human resources manager to perform her job duties as a manager.

Figure 19:
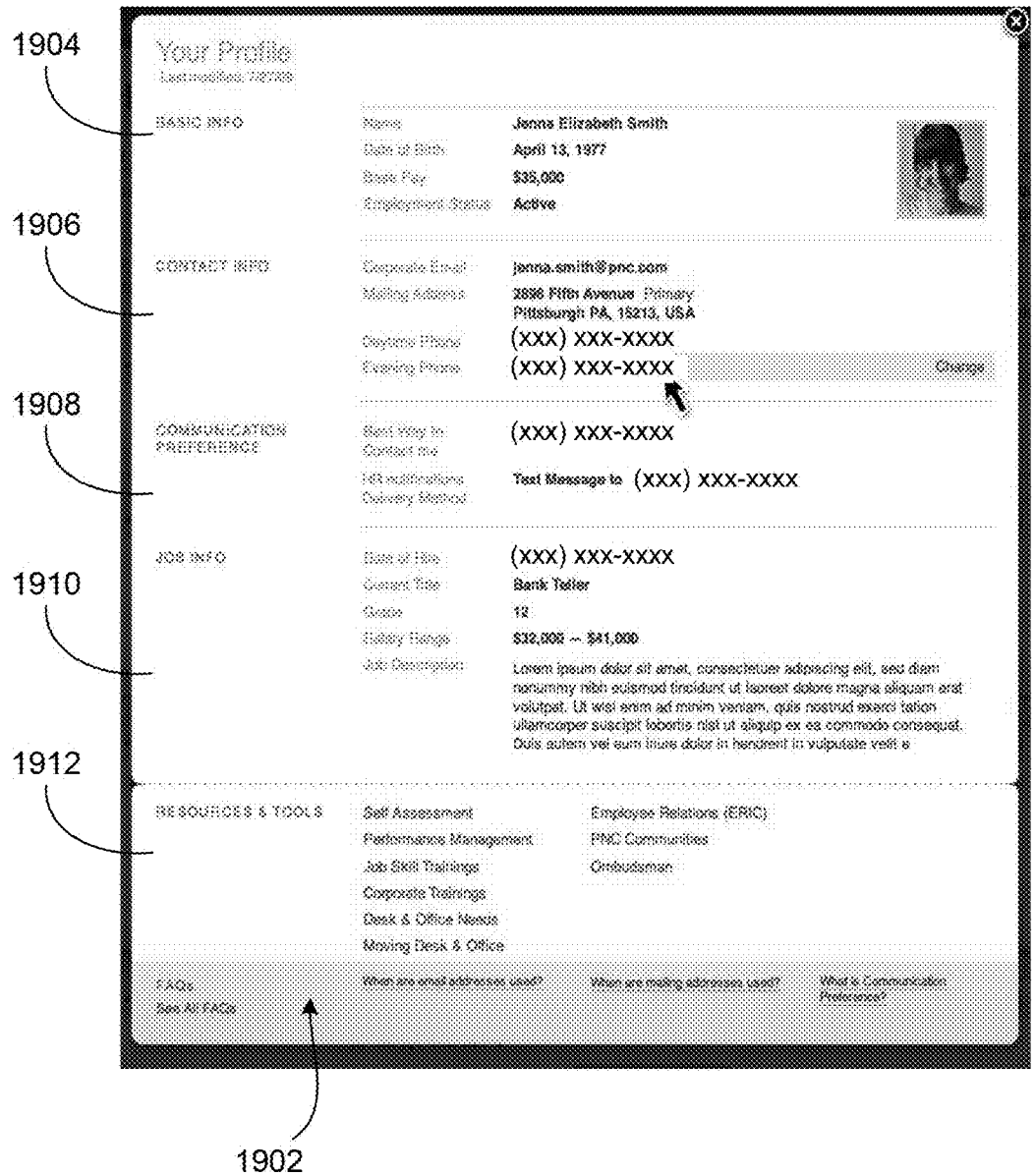
FIG. 19 includes a screen display that illustrates an example of a user profile that may be stored within a human resources information management system.
Figure 20A:
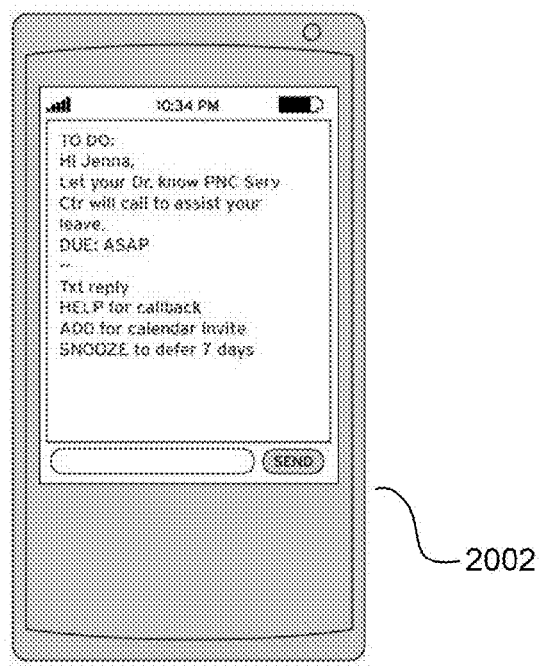
FIGS. 20A and 20B schematically depict examples of communication devices that may be configured to communicate with a human resources information management system; and, FIG. 21 includes a screen display that illustrates an example of a user profile that may be stored within a human resources information management system.
Figure 20B:
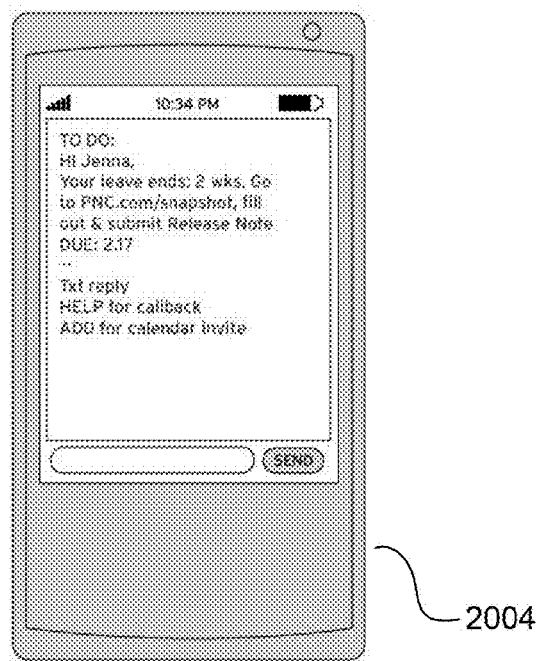

FIG. 19 includes a screen display 1902 that illustrates an example of a user profile that may be stored within the management system 201. As shown, the user profile may include basic information 1904, contact information 1906, communication preferences 1908, job information 1910, and a resources and tools section 1912. It can be seen that the communication preferences 1908 can be predetermined to facilitate communications between the system 201 and the user 204 through a medium or in a format that is desired by the user 204. For example, the schematic illustrations of FIGS. 20A and 20B depict examples of communication devices 242 (e.g., devices 2002, 2004) that may be configured to communicate with the system 201 to receive text messages regarding human resources information stored within the system 201.

Figure 21:
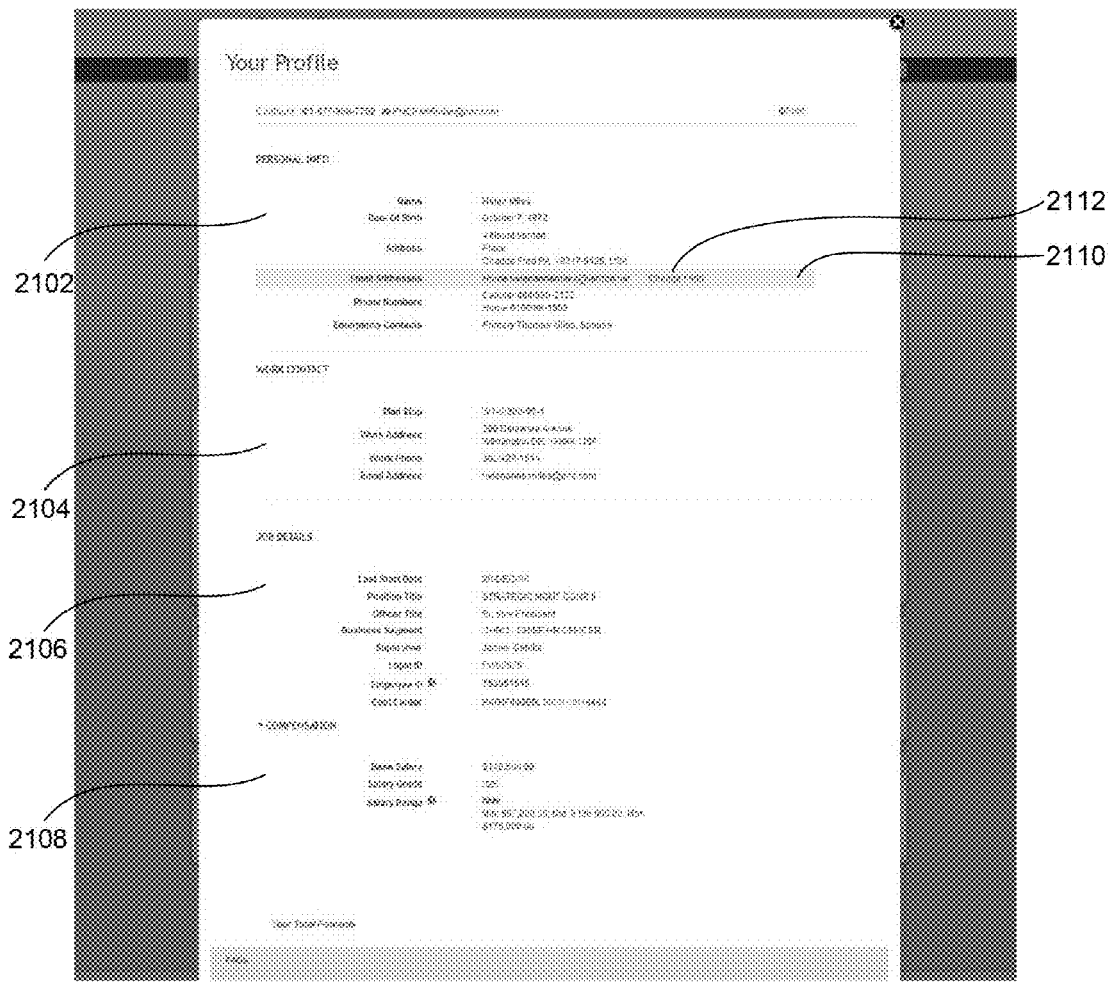

FIG. 21 illustrates another example of a user profile that may be stored within the management system 201. As shown, the user profile may include personal information 2102, work contact information 2104, job details information 2106, and/or compensation data 2108. In various embodiments, data within the user profile can be configured for one-click access, as illustrated by the highlighted portion 2110 of the "e-mail addresses" data field, for example. In this example, a "Change/Add" option 2112 can be made available for user access, for example, to facilitate modifications to information contained in the profile.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, touch screens, pens, monitors, printers, hard disk drives, floppy disk drives, joysticks, and image scanners.

Embodiments of the methods and systems described herein may divide functions between or among separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. An apparatus for processing human resources information, the apparatus comprising:
    a computer processor programmed for executing computer-readable instructions included within at least one module;
    at least one data storage media operatively associated with the computer processor, each data storage media configured to store human resources information;
    a tag cloud comprising at least one term or phrase associated with content of the human resources information, wherein:
        each term or phrase is programmed to search the human resources information stored in the at least one data storage media and retrieve search results in response to selection of the term or phrase;
        each term or phrase having a higher frequency of instantiation is displayed in a larger font compared to terms or phrases having lesser frequency of instantiation; and,
        each term or phrase designated as having greater impetus and importance is highlighted;
    wherein each module is programmed for generating a screen display including at least one link associated with the human resources information stored in the at least one data storage media;
    wherein at least one screen display is programmed to search for and display the human resources information in accordance with at least one panel, is configured to receive user inputs, and is provided with a toggle feature enabling different views of the human resources information, wherein:
        at least one panel is configured to discriminatorily display and highlight information based upon a user's status;
        at least one panel is configured to display the human resources information as sub-sections and/or sub-portions, wherein selection of the sub-section and/or sub-portion enlarges and/or pops out from the screen display;
        at least one panel is configured to provide time-based action notifications in at least one of a calendar view or a list view, each time-based action notification having a relative position on the screen display and provided with status indicators and color-code schemes to illustrate impetus and importance thereof, wherein the relative position is associated with a status of the time-based notification and the time-based notification is automatically moved relative to other time-based notifications based upon the status thereof, wherein the status indicators consist of indicators selected from the group of a to-do indicator, a recommendation indicator, and a confirmation indicator;
        at least one panel is provided with an options function enabling access via the links to forms and timelines associated with recommended benefits available to the user of the apparatus, wherein the recommended benefits displayed are automatically determined by the user inputs and the human resources information associated with the at least one panel;
        at least one panel is configured to automatically select and display career development classes based upon the user inputs related to identification for future placement or promotion; and,
        at least one panel is configured to demonstrate an impact of various options;
    wherein at least one module is a learning center module and the apparatus is configured to utilize the learning center module as a central location for presenting a plurality of the panels in a hierarchy and facilitating access to each data storage media;
    wherein at least one panel is configured to communicate alerts to users; and,
    wherein communication preferences are predetermined to facilitate communications between the apparatus and the user through a medium or in a format that is desired by the user.

2. The apparatus recited in claim 1, wherein the modules further comprise a user presentation module, a notification module, a compensation module, a benefits module, a retirement module, a career development module, and a profile module.

3. The apparatus recited in claim 1, wherein the panels comprise a notification panel, a compensation panel, a benefits panel, a retirement panel, and a career development panel.

4. The apparatus recited in claim 1, wherein the time-based action notifications are configured to be exported to a Lotus Notes or Outlook calendar.

5. The apparatus of claim 1, wherein at least one module is further programmed to display a human resources information center including at least one step-by-step guide, each step-by-step guide being programmed to include all areas that affect an employee for a given topic and provided with at least one of the links to the forms and timelines.

6. The apparatus of claim 1, wherein at least one module is provided with a browse by category function programmed to search the human resources information by at least one category.

7. The apparatus of claim 1, wherein at least one module is further programmed for communicating a set of most popular topics as possible search terms.

8. The apparatus of claim 1, wherein the learning center module is programmed to display the hierarchy in response to the user's entry point for accessing the learning center module.

9. The apparatus of claim 1, wherein the human resources information includes at least one article.

10. The apparatus of claim 1, wherein at least one panel is configured to enable scheduling of future events.

11. The apparatus of claim 1, wherein at least one timeline is configured to highlight upcoming events in response to user inputs and existing human resources information.

12. The apparatus of claim 1, wherein at least one options function is configured to provide the recommended benefits in response to user inputs and existing human resources information.

\* \* \* \* \*